(12) United States Patent
Yodogawa et al.

(10) Patent No.: US 10,551,570 B2
(45) Date of Patent: Feb. 4, 2020

(54) OPTICAL TRANSMISSION CONNECTOR, PLUG, AND RECEPTACLE

(71) Applicant: YOKOWO CO., LTD., Tokyo (JP)

(72) Inventors: Akihiro Yodogawa, Tokyo (JP); Hideki Kamitsuna, Tokyo (JP); Ryo Nagase, Chiba (JP)

(73) Assignee: YOKOWO CO., LTD., Tokyo (JP)

( * ) Notice: Subject to any disclaimer, the term of this patent is extended or adjusted under 35 U.S.C. 154(b) by 233 days.

(21) Appl. No.: 15/521,940

(22) PCT Filed: Oct. 2, 2015

(86) PCT No.: PCT/JP2015/078008
§ 371 (c)(1),
(2) Date: Apr. 26, 2017

(87) PCT Pub. No.: WO2016/067827
PCT Pub. Date: May 6, 2016

(65) Prior Publication Data
US 2018/0011256 A1  Jan. 11, 2018

(30) Foreign Application Priority Data

Oct. 28, 2014 (JP) .................................. 2014-219601

(51) Int. Cl.
G02B 6/38 (2006.01)
H01R 13/46 (2006.01)
H01R 24/62 (2011.01)
G02B 6/42 (2006.01)
H01R 13/453 (2006.01)
(Continued)

(52) U.S. Cl.
CPC ......... *G02B 6/3817* (2013.01); *G02B 6/3885* (2013.01); *G02B 6/4206* (2013.01);
(Continued)

(58) Field of Classification Search
CPC .. G02B 6/3817; G02B 6/4292; G02B 6/4214; G02B 6/4219; H01R 2107/00;
(Continued)

(56) References Cited

U.S. PATENT DOCUMENTS 4,708,432 A    11/1987  Berg
4,912,747 A *   3/1990  Sakama ............... A47L 15/4259
                                                          361/600
(Continued)

FOREIGN PATENT DOCUMENTS

JP    2007-011060 A    1/2007
JP    2012-068535 A    4/2012
WO      85/00899 A1    2/1985

OTHER PUBLICATIONS

International Search Report and Written Opinion dated Dec. 1, 2015 corresponding to International Patent Application No. PCT/JP2015/078008, and partial English translation thereof.
(Continued)

*Primary Examiner* — Akm E Ullah
(74) *Attorney, Agent, or Firm* — Squire Patton Boggs (US) LLP

(57) ABSTRACT

A plug of a connector that performs optical transmission is provided with an optical connection unit. The optical connection unit includes a lens that is provided on a side surface of the optical connection unit and performs optical connection with a lens provided on an optical connection unit of a receptacle in a direction orthogonal to an inserting/removing direction of the plug, and a locating surface that is provided on the side surface of the optical connection unit and abuts on a locating surface of the receptacle to determine a position of the optical connection unit in a mating condition of the plug into the receptacle.

15 Claims, 14 Drawing Sheets

(51) Int. Cl.
*H01R 107/00* (2006.01)
*H01R 13/627* (2006.01)

(52) U.S. Cl.
CPC ......... *G02B 6/4214* (2013.01); *G02B 6/4219* (2013.01); *G02B 6/4292* (2013.01); *H01R 13/46* (2013.01); *H01R 13/4538* (2013.01); *H01R 13/6273* (2013.01); *H01R 24/62* (2013.01); *H01R 2107/00* (2013.01)

(58) Field of Classification Search
CPC ............... H01R 13/46; H01R 13/4538; H01R 13/6273; H01R 24/62
USPC .......................................................... 385/80
See application file for complete search history.

(56) References Cited

U.S. PATENT DOCUMENTS

| | | | |
|---|---|---|---|
| 8,708,579 B2* | 4/2014 | Shiratori | G02B 6/322 |
| | | | 385/89 |
| 9,052,471 B2* | 6/2015 | Hioki | G02B 6/3893 |
| 9,063,300 B2* | 6/2015 | Torikai | G02B 6/3817 |
| 9,164,244 B2* | 10/2015 | Taira | G02B 6/3825 |
| 9,570,834 B2* | 2/2017 | Underwood | H01R 13/4534 |
| 9,647,402 B2* | 5/2017 | Lee | H01R 24/78 |
| 2011/0229087 A1 | 9/2011 | Cody et al. | |
| 2012/0114283 A1* | 5/2012 | Shimotsu | G02B 6/4292 |
| | | | 385/27 |
| 2012/0121223 A1* | 5/2012 | Tamura | G02B 6/3817 |
| | | | 385/92 |
| 2012/0195556 A1 | 8/2012 | Wang et al. | |
| 2012/0263415 A1 | 10/2012 | Tan et al. | |
| 2013/0136400 A1 | 5/2013 | Isenhour et al. | |
| 2013/0170795 A1 | 7/2013 | Wu | |

OTHER PUBLICATIONS

Japanese Office Action Notification of Reasons for Refusal application No. 2014-219601 dated Jun. 12, 2018.
Japanese Office Action corresponding to Application No. 2014-219601, dated Dec. 25, 2018.

* cited by examiner

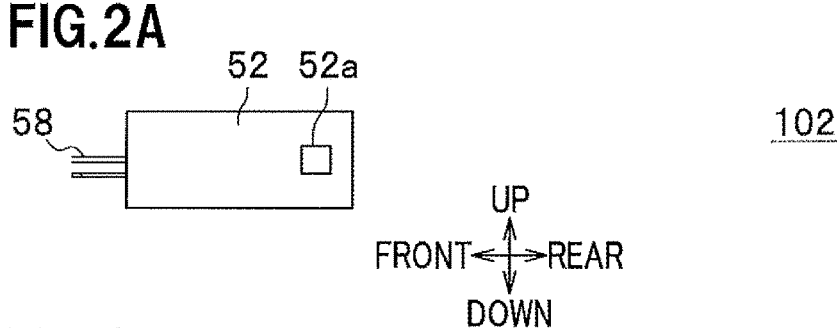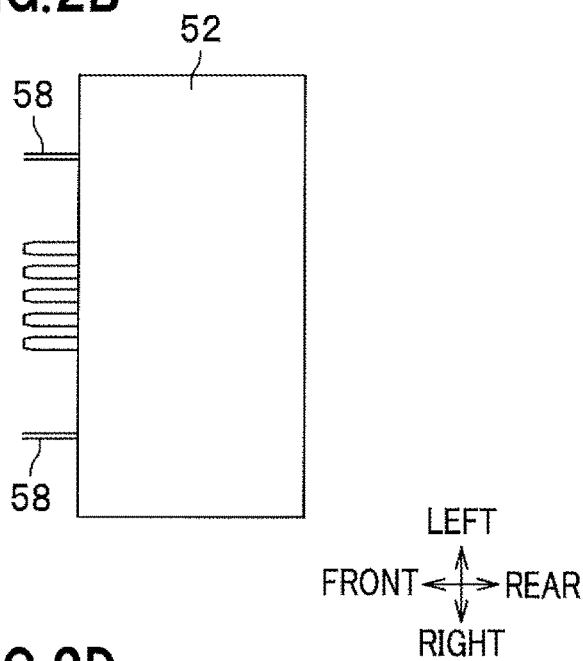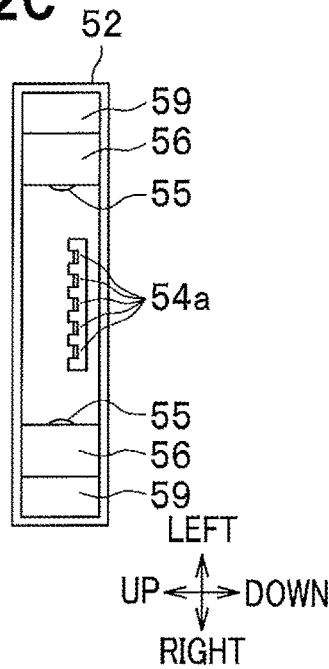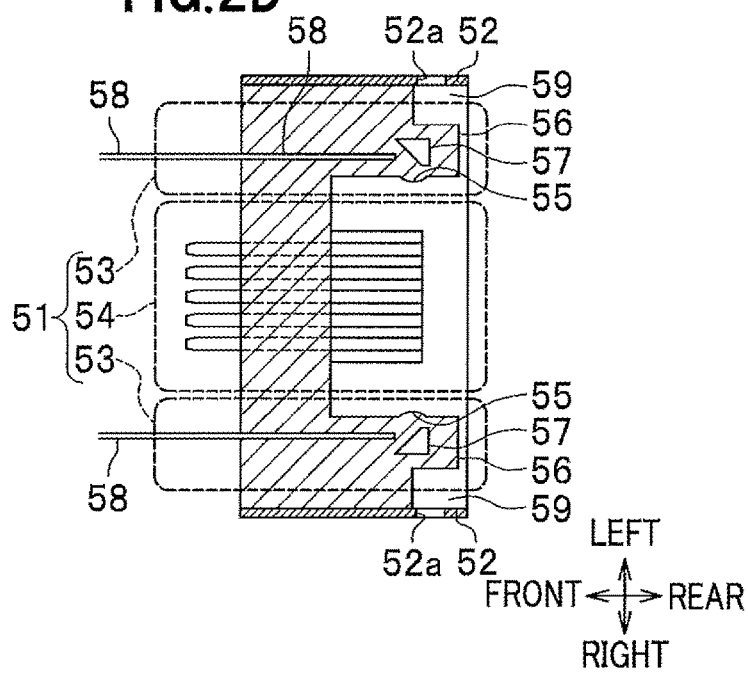

COMPARATIVE EXAMPLE

BOTTOM OF ACCEPTING SECTION (LOCATING SURFACE)

FIG.7A
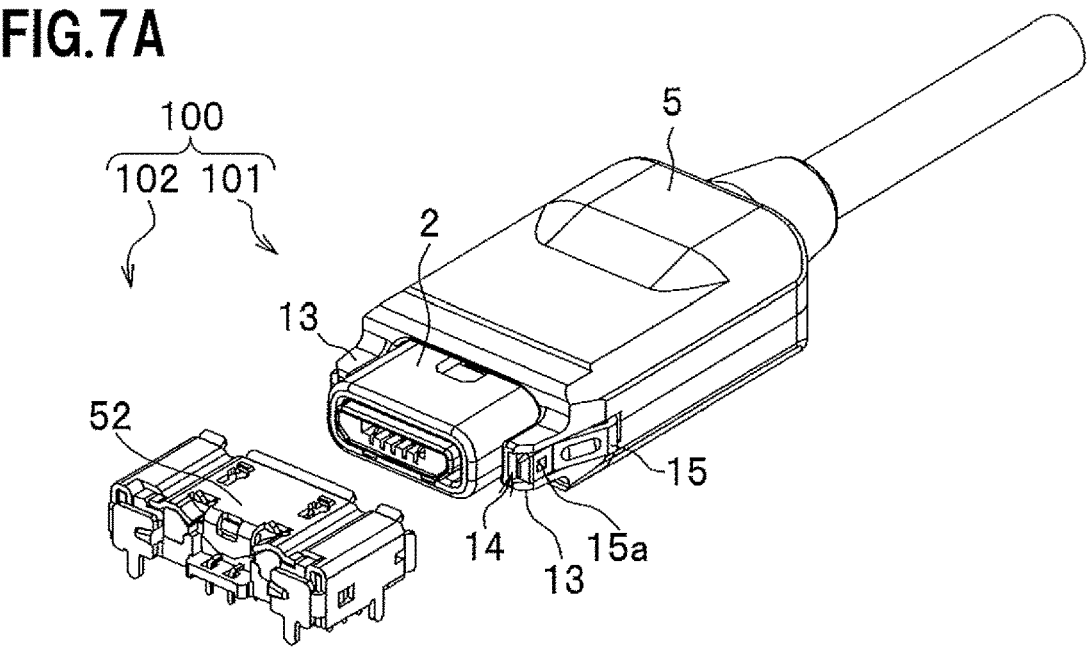
FIG.7B
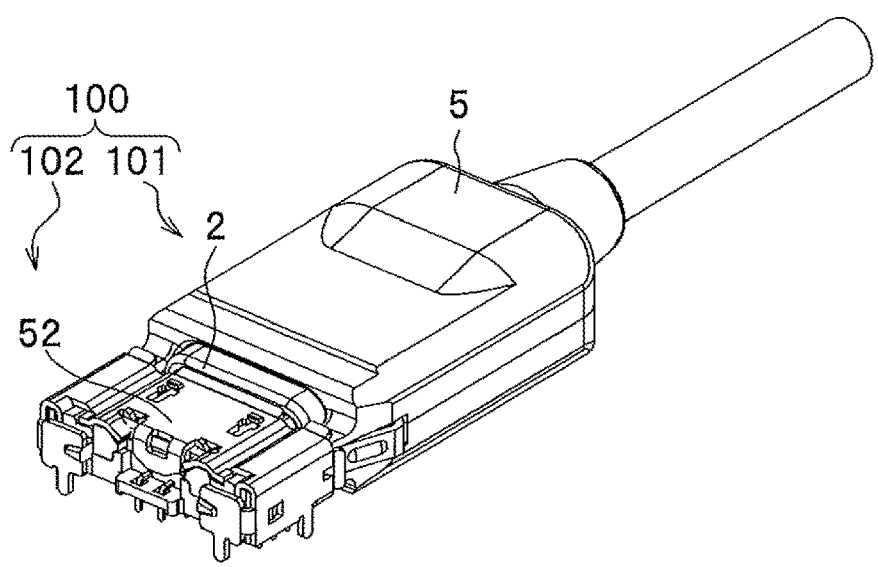
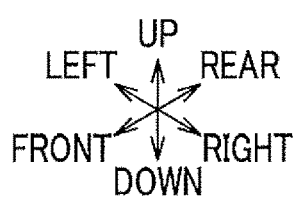

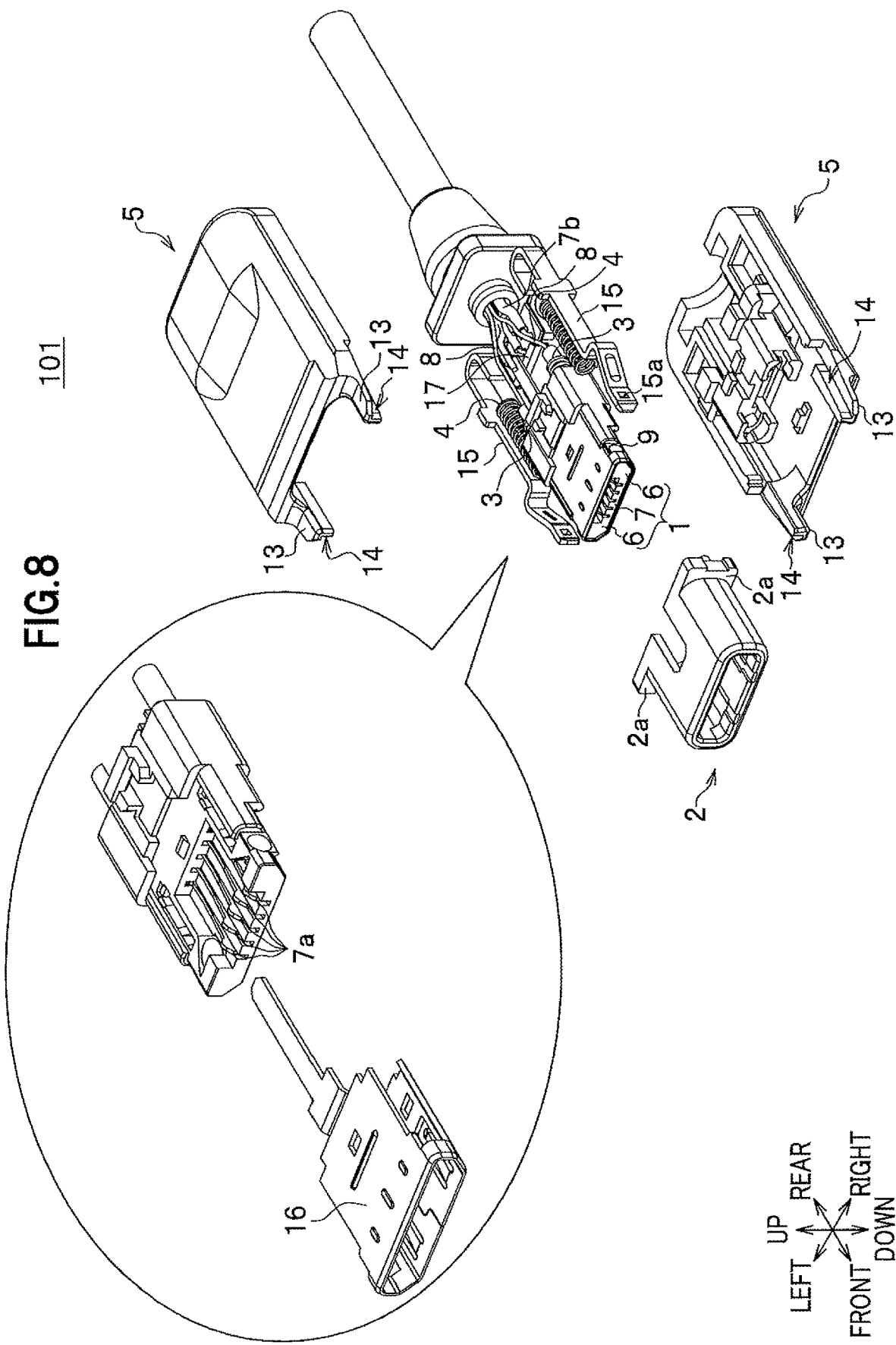

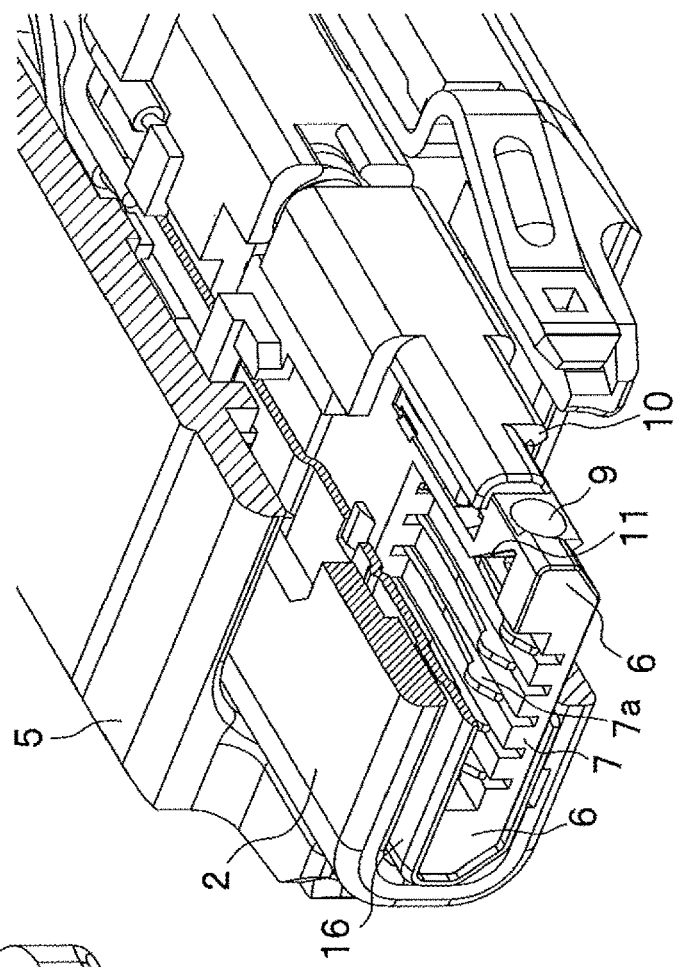
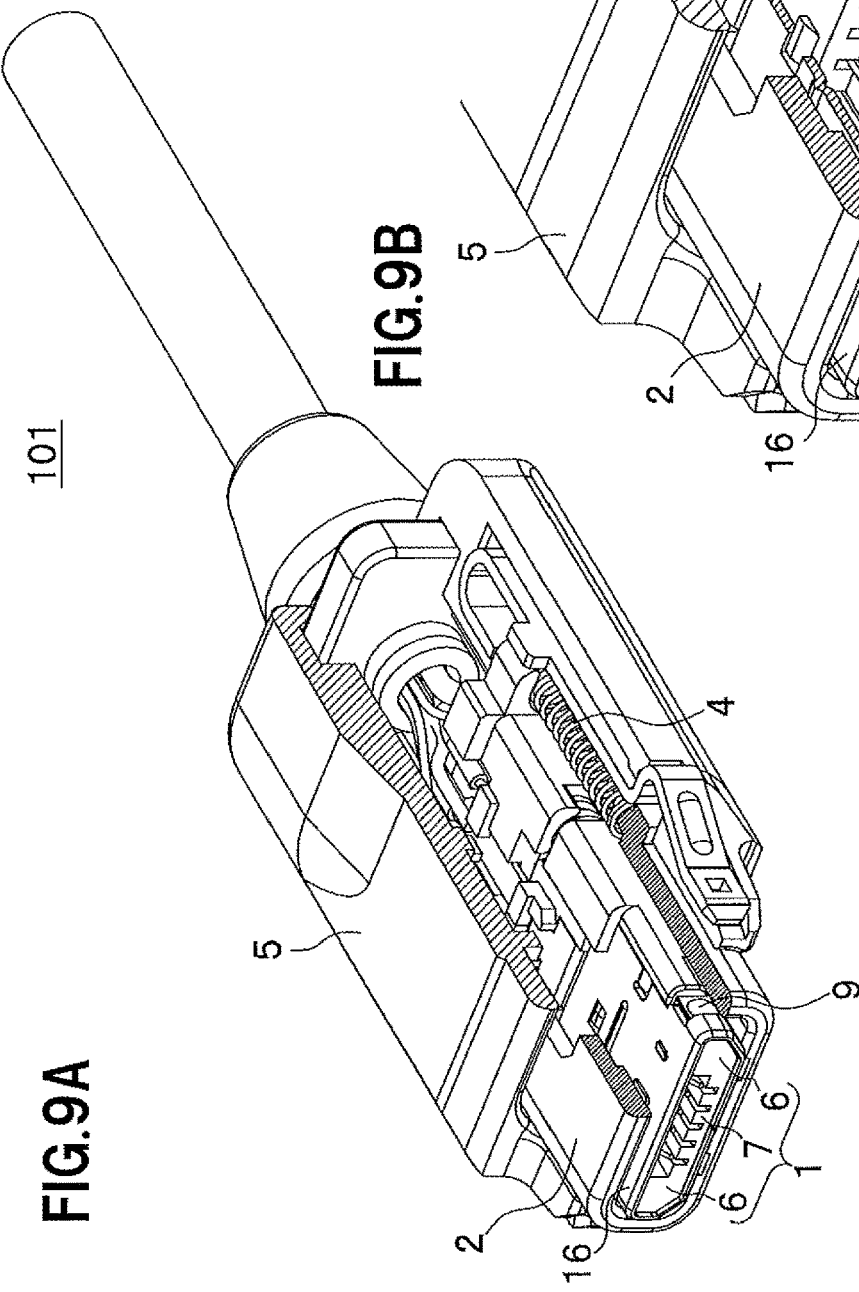
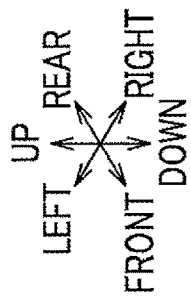

KNOWN PLUG FOR ELECTRIC TRANSMISSION

KNOWN PLUG FOR ELECTRIC TRANSMISSION

OPTICAL TRANSMISSION CONNECTOR, PLUG, AND RECEPTACLE

TECHNICAL FIELD

The present invention relates to a technique for a connector adapted to perform optical transmission.

BACKGROUND ART

Patent Literature 1 discloses a technique for a multi-core optical connector in which a pin insert (equivalent to a plug) having a ferrule holding a fiber bent at 90 degrees is fitted into a socket insert (equivalent to a receptacle) having a ferrule holding a fiber parallel to a back plane. According to the technique in Patent Literature 1, in the mating condition, a front surface (locating surface) of the ferrule provided in the pin insert abuts on the bottom (datum surface) of an accepting section of the socket insert, thereby determining a position of the pin insert relative to the socket insert. At this time, the optical axis of a lens on a side surface of the ferrule in the pin insert and the optical axis of a lens on a front surface of the ferrule in the socket insert are aligned with each other, allowing optical connection to be carried out.

CITATION LIST

Patent Literature

Patent Literature 1: Japanese Unexamined Patent Application Publication No. 2012-68535 (FIG. 9, etc.)

SUMMARY OF INVENTION

Technical Problem

Optical-axis alignment between the lens of the plug and the lens of the receptacle requires a high accuracy. However, according to the technique disclosed in Patent Literature 1, the datum surface of the socket insert that has a role as locating in the mating condition is relatively large in area, thus foreign materials such as dust and mote are easy to gain entry into the accepting section and easy to be accumulated on the datum surface. Consequently, there is a disadvantage in that the pin insert is fitted into the socket insert with foreign materials adhering on the locating surface of the ferrule provided in the pin insert and/or the datum surface of the socket insert, thereby causing a decrease in the accuracy of optical-axis alignment between the lenses.

In order to cope with the above disadvantage, a person having ordinary skill in the art of optical connectors has taken measures such as cleaning the mating portion every time the optical connector is inserted or withdrawn, and attaching a protection cap to the mating portion at a time of non-use of the optical connector, against adhesion of foreign materials. However, it is generally cumbersome to take these measures, which has become an obstacle to widespread use of optical connectors for a person other than a person with ordinary skill in the art.

In view of these circumstances, the present invention makes it an object thereof to provide a connector adapted to perform optical transmission, which makes it possible to prevent adhesion of foreign materials without taking cumbersome measures against foreign materials, thereby improving accuracy of optical-axis alignment between a plug and a receptacle and allowing even any person other than a person with ordinary skill in the art to easily use the connector.

Solution to Problem

In order to attain the above object, the present invention provides a connector adapted to perform optical transmission, including: a plug of the connector provided with a plug-side optical connection unit; and a receptacle of the connector provided with a receptacle-side optical connection unit, the plug-side optical connection unit including: a plug-side optical connection part that is provided on a side surface of the plug-side optical connection unit and adapted to perform optical connection with a receptacle-side optical connection part provided on the receptacle-side optical connection unit in a direction orthogonal to an inserting/removing direction of the plug; and a plug-side locating part that is provided on the side surface of the plug-side optical connection unit and adapted to abut on a receptacle-side locating part of the receptacle to determine a position of the plug-side optical connection unit in a mating condition of the plug and the receptacle, the receptacle-side optical connection unit including: the receptacle-side optical connection part that is adapted to perform optical connection with the plug-side optical connection part in the direction orthogonal to the inserting/removing direction of the plug; and a receptacle-side locating part that is adapted to abut on the plug-side locating part to determine a position of the receptacle-side optical connection unit in the mating condition.

Details will be described later.

Advantageous Effects of Invention

The present invention allows the connector adapted to perform optical transmission to be provided, which makes it possible to prevent adhesion of foreign materials without taking cumbersome measures against foreign materials, thereby improving accuracy of the optical-axis alignment between the plug and the receptacle and allowing even any person other than a person with ordinary skill in the art to easily use the connector.

BRIEF DESCRIPTION OF DRAWINGS

FIGS. 1A to 1D are schematic views of a plug according to an embodiment of the present invention, in which FIG. 1A is a side view; FIG. 1B is a top view; FIG. 1C is a front view; and FIG. 1D is a view showing the inside structure.

FIGS. 2A to 2D are schematic views of a receptacle according to the embodiment, in which FIG. 2A is a side view; FIG. 2B is a top view; FIG. 2C is a front view; and FIG. 2D is a view showing the inside structure.

FIGS. 5A and 5B are schematic views showing the inside structure of a connector in a mating condition in a comparative example, in which FIG. 5A is a view showing the case in which there is no foreign material, and FIG. 5B is a view showing the case in which there are foreign materials.

FIGS. 6A to 6D are schematic views for explaining actions of the connector according to the embodiment, in which FIG. 6A is a view showing a non-insertion condition; FIG. 6B is a view showing an abutting condition of a shutter;

FIG. 6C is a view showing an abutting condition of a locating surface; and FIG. 6D is a view showing a mating condition.

FIGS. 7A and 7B are detailed views of the connector according to the embodiment, in which FIG. 7A is an external perspective view of the plug and the receptacle that are in the non-insertion condition, and FIG. 7B is an external perspective view of the plug and the receptacle that are in the mating condition.

FIG. 8 is an exploded perspective view of the plug according to the embodiment.

FIGS. 9A and 9B are perspective views of the plug according to the embodiment, in which FIG. 9A is a partially cutaway view, and FIG. 9B is another partially cutaway view.

FIGS. 10A and 10B are detailed views of the receptacle according to the embodiment, in which FIG. 10A is a perspective view, and FIG. 10B is an exploded perspective view.

FIGS. 11A and 11B are perspective views of the receptacle according to the embodiment, in which FIG. 11A is a partially cutaway view, and FIG. 11B is another partially cutaway view.

FIGS. 12A and 12B are views for explaining appearances in which a known electrical plug is inserted into the receptacle according to the embodiment, in which FIG. 12A is a view showing a non-insertion condition, and FIG. 12B is a view showing a mating condition.

FIGS. 13A and 13B are detailed views showing, partially cutting away, the inside structure of the connector in the mating condition, in which FIG. 13A is a top view, and FIG. 13B is a back side view (bottom view).

FIGS. 15A and 15B are perspective views of the plug according to another embodiment, in which FIG. 15A is a partially cutaway view, and FIG. 15B is another partially cutaway view.

DESCRIPTION OF EMBODIMENTS

Figure 1A:
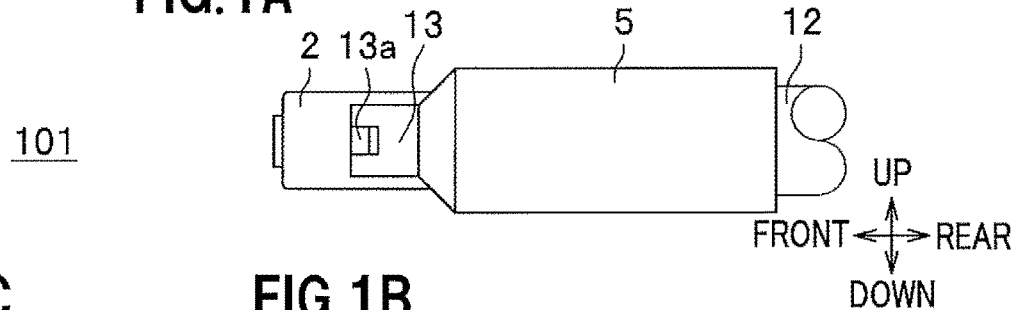
Figure 1C:
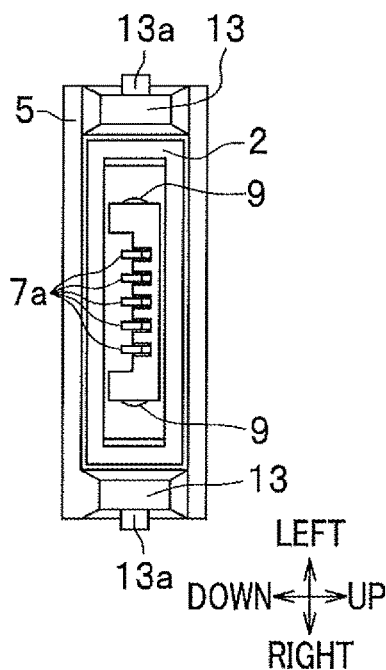
Figure 1B:
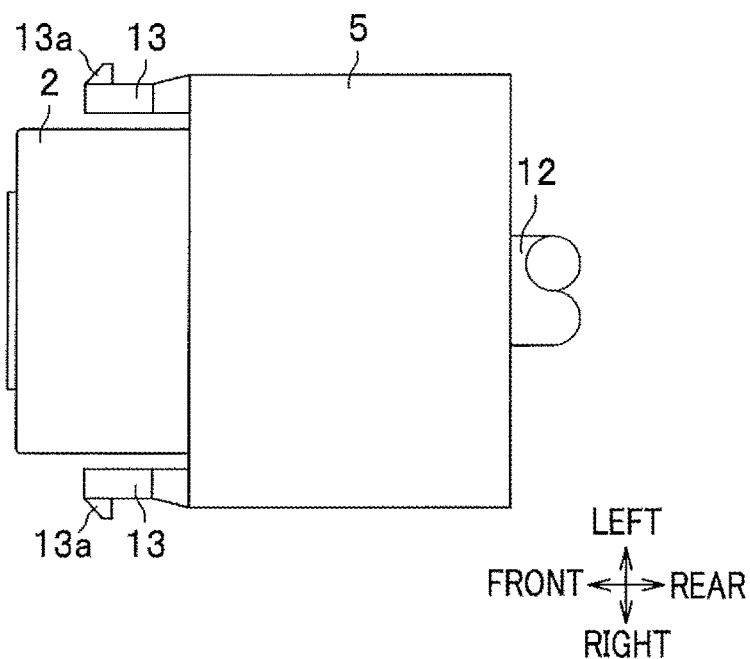
Figure 1D:
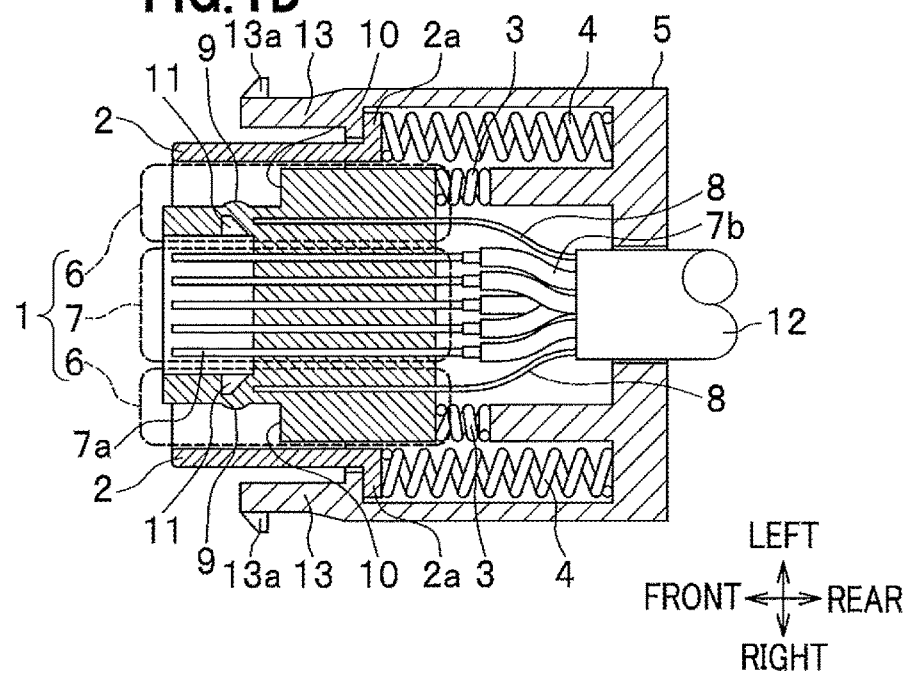

Embodiments of the present invention will be hereinafter described in detail with reference to the drawings. Note that, for convenience of explanation, directions of "front", "rear", "up", "down", "left" and "right" are indicated as shown in each figure. The front of a plug indicates the front side of the plug, and the front of a receptacle indicates the rear side of the receptacle. Moreover, the term "perpendicular" includes the meaning of "nearly perpendicular", and the term "orthogonal" includes the meaning of "nearly orthogonal".

First, an outline of a connector 100 according to the present embodiment will be described using schematic views shown in FIGS. 1A to 1D through FIGS. 6A to 6D. The connector 100 according to the present embodiment is, for example, an optical/electrical hybrid connector 100 that performs optical/electrical hybrid transmission. The connector 100 according to the present embodiment is provided with a plug 101 that constitutes an inserting-side connector, and a receptacle 102 that constitutes a receiving-side connector.

(Outline of Plug 101)

As shown in FIG. 1, the plug 101 according to the present embodiment that constitutes an inserting-side connector is provided with an optical and electrical connection unit 1, a shutter 2, a resilient member 3 (second urging part), a resilient member 4 (first urging part), and a case 5.

The optical and electrical connection unit 1 constitutes a connection body for an optical and electrical connection unit 51 (FIGS. 2A to 2D) provided in the receptacle 102. The optical and electrical connection unit 1 is provided with two optical connection units 6 (plug-side optical connection units), and one electrical connection unit 7 (plug-side electrical connection unit).

The optical connection units 6 are each disposed at both sides in the right-left direction of the electrical connection unit 7, and may be integrally formed with the electrical connection unit 7, or may be separately formed from the electrical connection unit 7 (FIGS. 1A to 1D show an integrated configuration). For example, one of the optical connection units 6 is used for transmission of optical connection (transmitting light to the receptacle 102), and the other of the optical connection units 6 is used for reception of optical connection (receiving light from the receptacle 102). The optical connection units 6 are each made of, for example, resin such as ULTEM [Registered Trademark] or PEI (polyetherimide). The optical connection units 6 each have a fiber hole formed therein, which accepts a head of a fiber 8 that extends in the front-rear direction. The optical connection units 6 are each provided with a lens 9 (plug-side optical connection part), a locating surface 10 (plug-side locating part), and an optical path conversion part 11.

The lens 9 is an optical element that refracts light. The lens 9 provided on the optical connection unit 6 located at the left side of the electrical connection unit 7 is disposed on the left side surface of the optical connection unit 6. The lens 9 provided on the optical connection unit 6 located at the right side of the electrical connection unit 7 is disposed on the right side surface of the optical connection unit 6. Since an inserting/removing direction of the plug 101 relative to the receptacle 102 corresponds to the front-rear direction in the figure, the lenses 9 are disposed on the side surfaces orthogonal to the inserting/removing direction of the plug 101. The lenses 9 are adapted to perform optical connection with lenses 55 (FIGS. 2A to 2D) of the optical and electrical connection unit 51 provided in the receptacle 102. An optical axis of each lens 9 is set so that the direction of optical connection with each lens 55 is orthogonal to the inserting/removing direction of the plug 101. Adopting the lenses makes it possible to enhance the function of optical connection. For example, adopting a lens that collimates light to be transmitted makes it possible to improve resistance to misalignment of the optical axis.

The locating surface 10 abuts on a locating surface 56 (FIGS. 2A to 2D) of the optical and electrical connection unit 51 provided in the receptacle 102 to determine a position (a position in the front-rear direction) of the optical connection unit 6 in a mating condition (FIG. 3) of the plug 101 into the receptacle 102. The locating surface 10 provided on the optical connection unit 6 located at the left side of the electrical connection unit 7 is formed on the left side surface of the optical connection unit 6 and integrally formed with the optical connection unit 6. The locating surface 10 provided on the optical connection unit 6 located at the right side of the electrical connection unit 7 is formed on the right side surface of the optical connection unit 6 and integrally formed with the optical connection unit 6. The locating surface 10 is a flat surface orthogonal to the front-rear direction. The locating surface 10 may be a surface non-orthogonal to the front-rear direction, or may be a non-flat surface.

Figure 4:
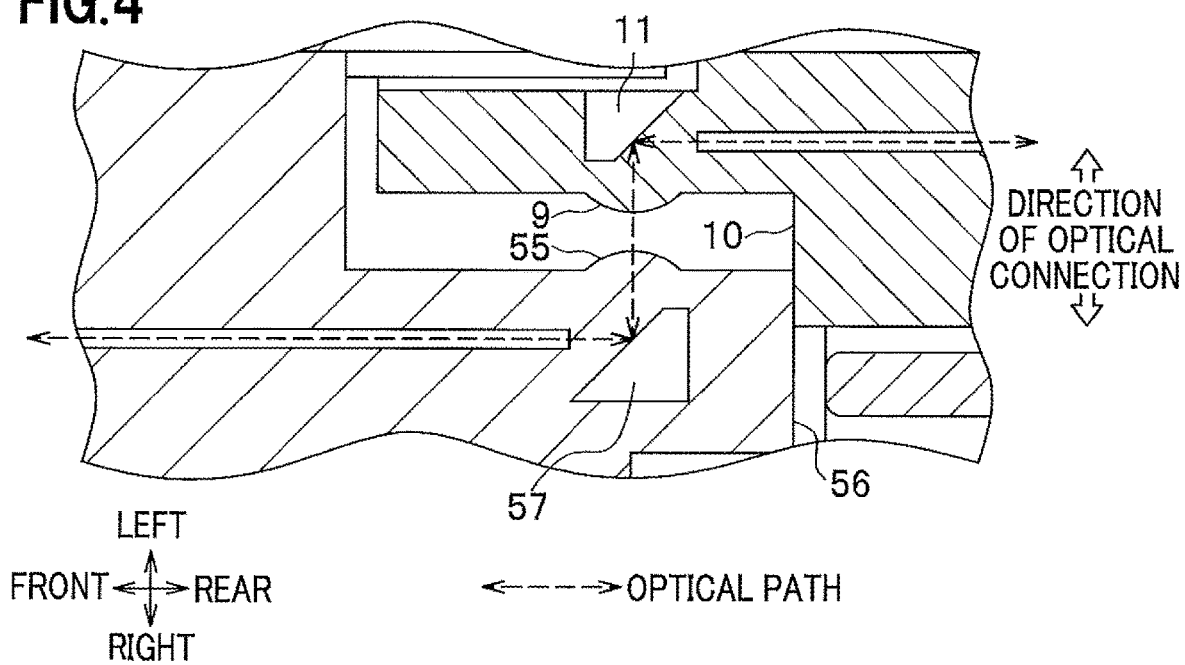
FIG. 4 is a schematic view for explaining details of optical connection.

The optical path conversion part 11 includes an inclined plane which is formed at an angle of nearly 45 degrees relative to the incident direction of light, thereby converting an optical path of light transmitted through the inside of the optical connection unit 6 into a direction of nearly 90 degrees relative to the incident direction. The optical path conversion part 11 provided on the optical connection unit 6 located at the left side of the electrical connection unit 7 converts an optical path of light transmitted in the front direction from the corresponding fiber 8 into the left direction orthogonal to the front direction and transmits the light to the corresponding lens 9, or converts an optical path of light transmitted in the right direction from the corresponding lens 9 into the rear direction orthogonal to the right direction and transmits the light to the corresponding fiber 8. The optical path conversion part 11 provided on the optical connection unit 6 located at the right side of the electrical connection unit 7 converts an optical path of light transmitted in the front direction from the corresponding fiber 8 into the right direction orthogonal to the front direction and transmits the light to the corresponding lens 9, or converts an optical path of light transmitted in the left direction from the corresponding lens 9 into the rear direction orthogonal to the left direction and transmits the light to the corresponding fiber 8 (FIG. 4). Since the optical connection unit 6 is made of a material (ULTEM, PEI or the like) having a refractive index of approximately 1.5 or more, part of the optical connection unit 6 is made into a hollow part to allow the hollow part to function as the optical path conversion part 11 (that is, medium of the optical path conversion part 11 is air), thereby allowing the light to be totally reflected.

The electrical connection unit 7 is centrally disposed in the right-left direction and adapted to perform electrical transmission (transmission/reception of electric signals) with the receptacle 102. The electrical connection unit 7 has a plurality of electrical connection terminals 7a extending in the front-rear direction and arranged side by side in the right-left direction (width direction). In the mating condition (FIG. 3), the electrical connection terminals 7a of the electrical connection unit 7 come into contact with electrical connection terminals 54a of an electrical connection unit 54 (FIGS. 2A to 2D) in the optical and electrical connection unit 51 provided in the receptacle 102, thereby realizing electrical transmission.

Note that a plurality of electrical wires 7b having the electrical connection terminals 7a at heads thereof and the fibers 8 are bundled together by a cable 12 to extend to rearward of the plug 101.

Moreover, since the optical connection units 6 are disposed at both sides in the right-left direction of the electrical connection unit 7, the plug 101 can be reduced in profile thereof. This makes it possible to realize a reduction in profile of the entire connector 100.

The shutter 2 has a tubular form to surround the side surface of the optical and electrical connection unit 1. The shutter 2 is adapted to be able to move in the front-rear direction along the side surface of the optical and electrical connection unit 1. The shutter 2 is brought into a "closed condition" when it is at a position to cover the lenses 9 and the locating surfaces 10, or into an "open condition" when it moves rearward compared with the closed condition to be at a position to allow the lenses 9 and the locating surfaces 10 to be exposed. The shutter 2 has a flange 2a formed at a rear end portion thereof. A front end portion of the resilient member 4 abuts on the flange 2a.

The resilient member 3 abuts on the rear side of each of two optical connection units 6 in the optical and electrical connection unit 1 to urge the optical and electrical connection unit 1 frontward. A rear end portion of the resilient member 3 abuts on a part of the case 5. The resilient member 3 is composed of, for example, a coil spring.

The resilient member 4 abuts on the rear end portion of the shutter 2 to urge the shutter 2 frontward. A rear end portion of the resilient member 4 abuts on a part of the case 5. The resilient member 4 is composed of, for example, a coil spring. Note that, since the flange 2a of the shutter 2 abuts on a part of the case 5 frontward to be latched together, the shutter 2 is prevented from popping out of the case 5.

The case 5 constitutes a housing of the plug 101, allows the front surface of the optical and electrical connection unit 1 to be exposed, and discharges the cable 12 that bundles the plurality of electrical wires 7b and the fibers 8 together, to rearward of the plug 101. The case 5 is made of, for example, resin. The case 5 includes a pair of location posts 13.

The location posts 13 are disposed on the front surface of the case 5 and at the outer side in the right-left direction of the shutter 2, and located within the receptacle 102 in the mating condition (FIG. 3) to determine a rotational position of the plug 101 having a rotational axis in the front-rear direction. The location posts 13 each include a claw part 13a (plug-side holding part) that is engaged in the mating condition with a hole 52a (receptacle-side holding part) (FIG. 2) formed on a case 52 (FIG. 2) of the receptacle 102. The claw part 13a and the hole 52a form a holding structure in which the plug 101 is held by the receptacle 102, thereby preventing the plug 101 in the mating condition from coming free from the receptacle 102 by urging forces of the resilient member 3 and the resilient member 4.

(Outline of Receptacle 102)

As shown in FIG. 2, the receptacle 102 according to the present embodiment that constitutes a receiving-side connector is provided with the optical and electrical connection unit 51 and the case 52.

The optical and electrical connection unit 51 constitutes a connection body for the optical and electrical connection unit 1 (FIGS. 1A to 1D) provided in the plug 101. The optical and electrical connection unit 51 is provided with two optical connection units 53 (receptacle-side optical connection units), and one electrical connection unit 54 (receptacle-side electrical connection unit).

The optical connection units 53 are each disposed at both sides in the right-left direction of the electrical connection unit 54, and may be integrally formed with the electrical connection unit 54, or may be separately formed from the electrical connection unit 54 (FIGS. 2A to 2D show an integrated configuration). For example, one of the optical connection units 53 is used for transmission of optical connection (transmitting light to the plug 101), and the other of the optical connection units 53 is used for reception of optical connection (receiving light from the plug 101). The optical connection units 53 are each made of, for example, resin such as ULTEM [Registered Trademark] or PEI (polyetherimide). The optical connection units 53 each have a fiber hole formed therein, which accepts a head of a fiber 58 that extends in the front-rear direction. The optical connection units 53 are each provided with the lens 55 (receptacle-side optical connection part), the locating surface 56 (receptacle-side locating part), and an optical path conversion part 57.

The lens 55 is an optical element that refracts light. The lens 55 provided on the optical connection unit 53 located at the left side of the electrical connection unit 54 is disposed on the left side surface of the optical connection unit 53. The lens 55 provided on the optical connection unit 53 located at the right side of the electrical connection unit 54 is disposed on the right side surface of the optical connection unit 53. The lenses 55 are adapted to perform optical connection with the lenses 9 (FIGS. 1A to 1D) of the optical and electrical connection unit 1 provided in the plug 101. An optical axis of each lens 55 is set so that the direction of optical connection with each lens 9 is orthogonal to the inserting/removing direction of the plug 101. Adopting the lenses makes it possible to enhance the function of optical connection. For example, adopting a lens that collimates light to be transmitted makes it possible to improve resistance to misalignment of the optical axis.

The locating surface 56 abuts on the locating surface 10 (FIGS. 1A to 1D) of the optical and electrical connection unit 1 provided in the plug 101 to determine a position (a position in the front-rear direction) of the optical connection unit 6 in the mating condition (FIG. 3) of the plug 101 into the receptacle 102. The locating surface 56 provided on the optical connection unit 53 located at the left side of the electrical connection unit 54 is formed on the rear surface of the optical connection unit 53 and integrally formed with the optical connection unit 53. The locating surface 56 provided on the optical connection unit 53 located at the right side of the electrical connection unit 54 is formed on the rear surface of the optical connection unit 53 and integrally formed with the optical connection unit 53. The locating surface 56 is a flat surface orthogonal to the front-rear direction. The locating surface 56 may be a surface non-orthogonal to the front-rear direction, or may be a non-flat surface.

The optical path conversion part 57 includes an inclined plane which is formed at an angle of nearly 45 degrees relative to the incident direction of light, thereby converting an optical path of light transmitted through the inside of the optical connection unit 53 into a direction of nearly 90 degrees relative to the incident direction. The optical path conversion part 57 provided on the optical connection unit 53 located at the left side of the electrical connection unit 54 converts an optical path of light transmitted in the rear direction from the corresponding fiber 58 into the right direction orthogonal to the rear direction and transmits the light to the corresponding lens 55, or converts an optical path of light transmitted in the left direction from the corresponding lens 55 into the front direction orthogonal to the left direction and transmits the light to the corresponding fiber 58. The optical path conversion part 57 provided on the optical connection unit 53 located at the right side of the electrical connection unit 54 converts an optical path of light transmitted in the rear direction from the corresponding fiber 58 into the left direction orthogonal to the rear direction and transmits the light to the corresponding lens 55, or converts an optical path of light transmitted in the right direction from the corresponding lens 55 into the front direction orthogonal to the right direction and transmits the light to the corresponding fiber 58 (FIG. 4). Since the optical connection unit 53 is made of a material (ULTEM, PEI or the like) having a refractive index of approximately 1.5 or more, part of the optical connection unit 53 is made into a hollow part to allow the hollow part to function as the optical path conversion part 57 (that is, medium of the optical path conversion part 57 is air), thereby allowing the light to be totally reflected.

The electrical connection unit 54 is centrally disposed in the right-left direction in the receptacle 102 and adapted to perform electrical transmission (transmission/reception of electric signals) with the plug 101. The electrical connection unit 54 has a plurality of electrical connection terminals 54a extending in the front-rear direction and arranged side by side in the right-left direction (width direction). In the mating condition (FIG. 3), the electrical connection terminals 54a of the electrical connection unit 54 come into contact with the electrical connection terminals 7a of the electrical connection unit 7 (FIGS. 1A to 1D) in the optical and electrical connection unit 1 provided in the plug 101, thereby realizing electrical transmission.

The case 52 constitutes a housing of the receptacle 102, and is adapted to house the optical and electrical connection unit 51 therein. The case 52 is made of, for example, metal. The case 52 includes a pair of location post accepting sections 59. Upon insertion of the plug 101, the up-down front end face of the shutter 2 abuts on an insertion opening of the case 52 (rear end portion of the case 52).

The location post accepting sections 59 are spaces formed inside the case 52 and at the outer side in the right-left direction of the optical connection units 53, and accept the location posts 13 of the plug 101 inserted into the receptacle 102. As described above, the holes 52a formed on the right-left side surfaces of the case 52, together with the claw parts 13a of the location posts 13, form a part of the holding structure in which the plug 101 is held by the receptacle 102.

(Side Surface Coupling)

Figure 3:
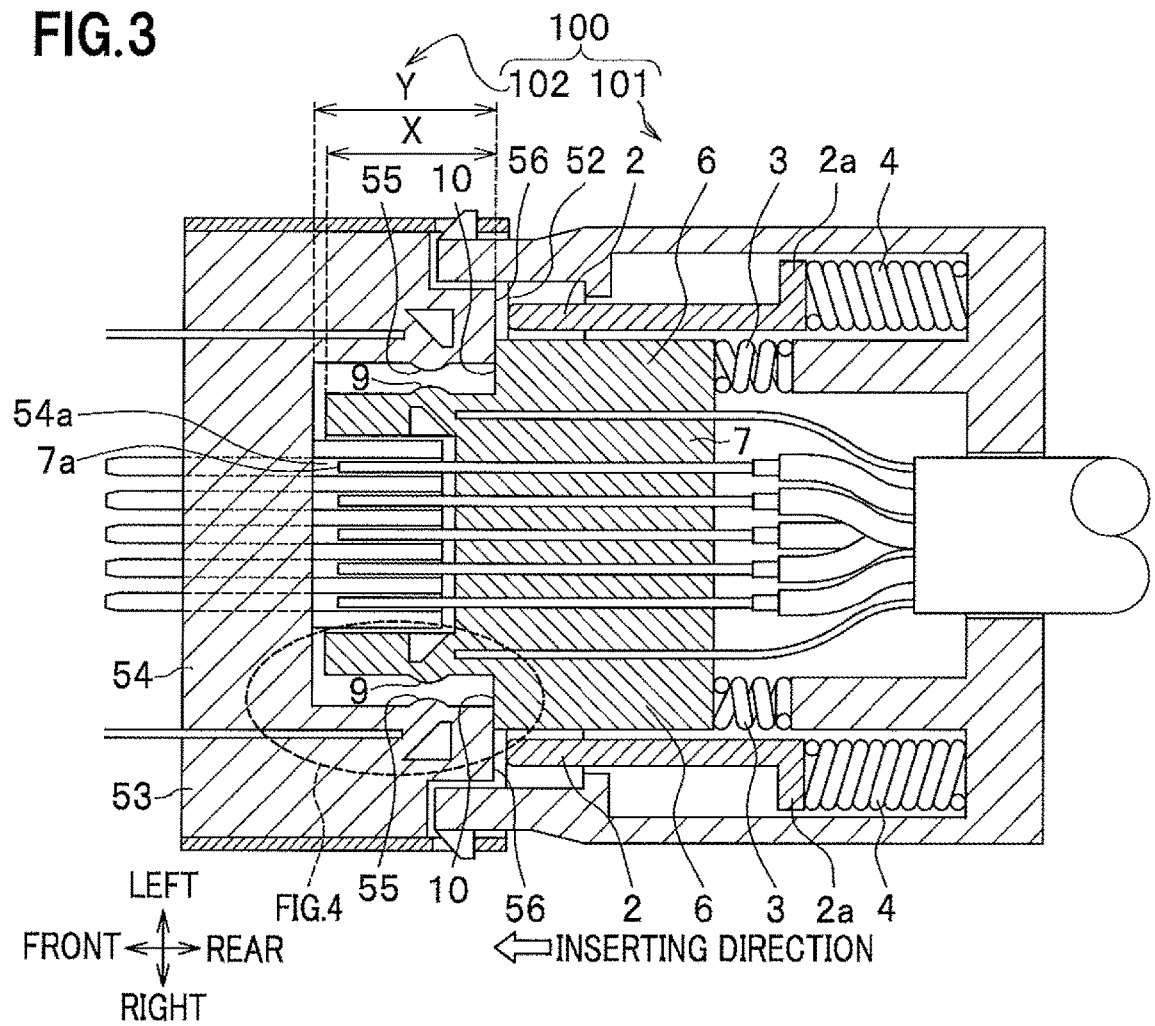
FIG. 3 is a schematic view showing the inside structure of a connector in a mating condition.

As shown in FIG. 3 and FIG. 4, in the mating condition, the shutter 2 is housed within the case 5 to allow the lenses 9 to be exposed, and the locating surface 10 of the optical connection unit 6 abuts on the locating surface 56 of the optical connection unit 53, thus allowing the lenses 9, 55 to face each other. Accordingly, the direction of optical connection performed between the lenses 9, 55 in the mating condition is the right-left direction and orthogonal to the front-rear direction which is the inserting/removing direction of the plug 101 (side surface coupling).

A conventional connector has generally adopted a structure in which the direction of optical connection is the same as the inserting/removing direction and the plug has an optical connection part such as a lens disposed at the front end face thereof. Such a connector has required adopting a structure in which a shutter for protecting the optical connection part of the plug is disposed at the plug insertion side relative to the front end face of the plug and adapted to move in a direction perpendicular to the inserting/removing direction in the mating condition. However, the shutter provided with such a structure has been disadvantageous in that a size in a vertical direction of the connector is increased. The present embodiment adopts the side surface coupling, thereby making it possible to move the shutter 2 in the inserting/removing direction and to realize downsizing in the vertical direction of the connector 100.

(Optical-Axis Alignment (1))

As shown in FIG. 3, electrical transmission of the connector 100 in the mating condition is realized by allowing the electrical connection terminals 7a of the electrical connection unit 7 in the plug 101 to be in surface contact with the electrical connection terminals 54a of the electrical connection unit 54 in the receptacle 102. At this time, since the electrical transmission is realized as long as a part of each electrical connection terminal 7a is in contact with each electrical connection terminal 54a, locating accuracy required between the electrical connection terminals 7a, 54a need not be made so high.

On the other hand, locating accuracy between the lenses 9, 55, which is required for optical-axis alignment between the lenses 9, 55 performing the side surface coupling, needs to be made high as compared to the above electrical connection, and especially with respect to the inserting/removing direction, needs to be made higher. As means to solve this problem, the present invention provides integration of the optical connection unit and the locating surface (first solution), and configuration in which the locating surface is provided not on the head of the plug but on the side surface of the plug (second solution), as described in detail below.

First, description will be given of the first solution. The plug 101 according to the present embodiment allows the optical connection units 6 to be integrated with the locating surfaces 10. The receptacle 102 according to the present embodiment also allows the optical connection units 53 to be integrated with the locating surfaces 56. This makes it possible, when the locating surfaces 10, 56 abut on each other, to reduce misalignment of the optical axis in the inserting/removing direction to the order of a dimensional tolerance of the integrated component.

(Optical-Axis Alignment (2))

Figure 5A:
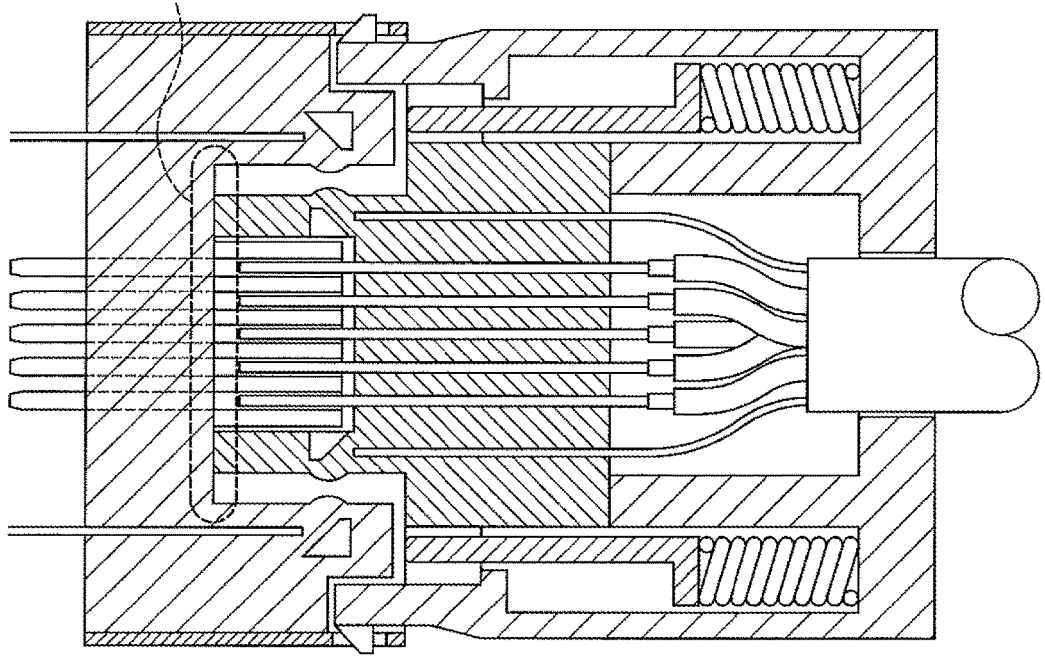
Figure 5B:
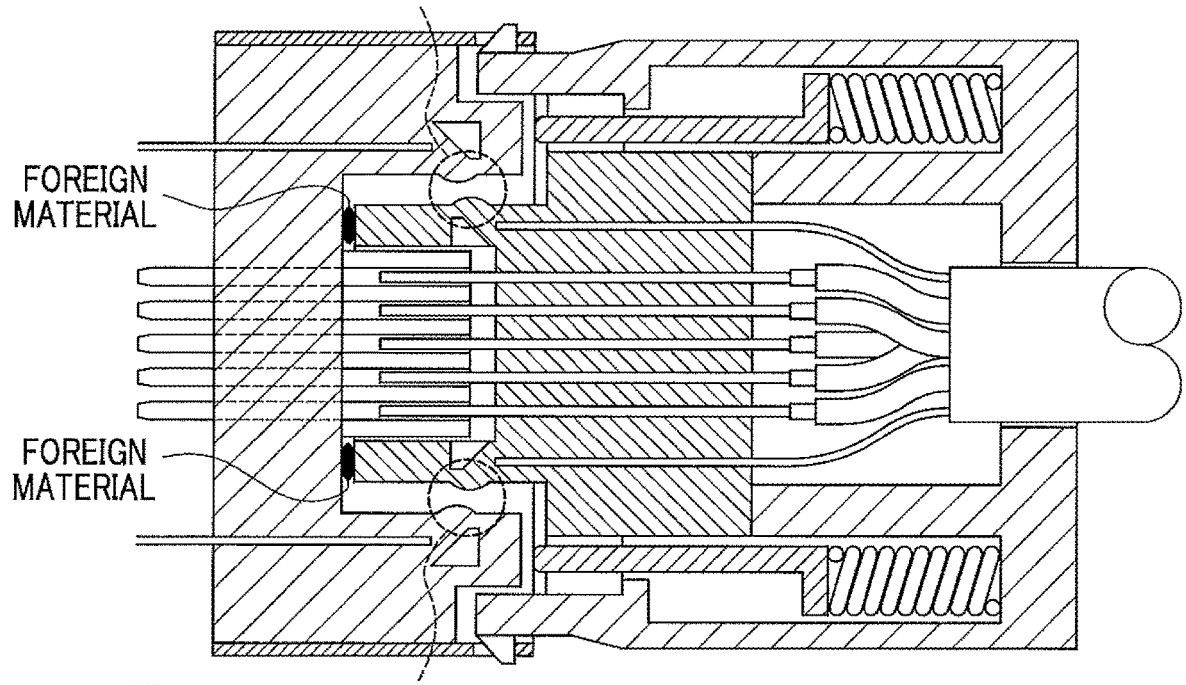

Next, description will be given of the second solution. As shown in a comparative example of FIG. 5A, a conventional connector (optical/electrical hybrid connector) allows a front surface of an optical and electrical connection unit of a plug, i.e., a front end face, to abut on the bottom of an accepting section which is formed in an optical and electrical connection unit of a receptacle and adapted to accept the optical and electrical connection unit of the plug, thereby performing optical-axis alignment between the lenses in the inserting/removing direction. That is, the front end face of the optical and electrical connection unit of the plug and the bottom of the accepting section of the optical and electrical connection unit of the receptacle define a locating surface of the optical and electrical connection unit of the plug. However, the bottom of the accepting section is relatively large in area, and in terms of the structure of the accepting section, foreign materials such as dust and mote are easy to be accumulated. Consequently, as shown in FIG. 5B, there is a high possibility that, with respect to the side surface coupling between the lenses, misalignment of the optical axis in the inserting/removing direction due to entry of foreign materials may be caused.

As shown in FIG. 3, the connector 100 according to the present embodiment allows the locating surface 10 of the plug 101 to be provided on the side surface of the optical connection unit 6, with respect to the side surface coupling by the lenses 9, 55. This makes it possible to relatively reduce the area of the locating surface 10 provided on the optical connection unit 6 of the plug 101 and thus to decrease a possibility that foreign materials adhere on the locating surface 10.

Moreover, depending on the locating surface 10 of the plug 101 being disposed at the rear relative to the lens 9, the locating surface 56 of the receptacle 102 is disposed on the rear surface of the optical connection unit 53 and near the insertion opening of the receptacle 102. This makes it possible, even if foreign materials adhere on the locating surface 56, to easily remove the foreign materials by blotting with cloth, breathing on, or the like.

Furthermore, the locating surface 10 of the plug 101 held by a user who uses the connector 100 is covered by the shutter 2 in a non-insertion condition, thus making it possible to considerably decrease a possibility that foreign materials adhere on the locating surface 10.

As a result of these advantageous effects, with respect to the side surface coupling between the lenses 9, 55, a possibility that misalignment of the optical axis in the inserting/removing direction due to entry of foreign materials is caused can be considerably decreased.

Note that, as shown in FIG. 3, a distance Y from the bottom of the accepting section in the optical and electrical connection unit 51 of the receptacle 102 to the locating surface 56 is longer than a distance X from the front end face of the optical and electrical connection unit 1 of the plug 101 to the locating surface 10. That is, there is an interspace between the bottom of the accepting section of the receptacle 102 and the front end face of the plug 101. This allows influence exerted on misalignment of the optical axis by foreign materials that have been accumulated on the bottom of the accepting section, to be considerably decreased.

(Function of Connector 100)

When the plug 101 is inserted into the receptacle 102, the constituent members of the plug 101 and the constituent members of the receptacle 102 function as described below.

Figure 6A:
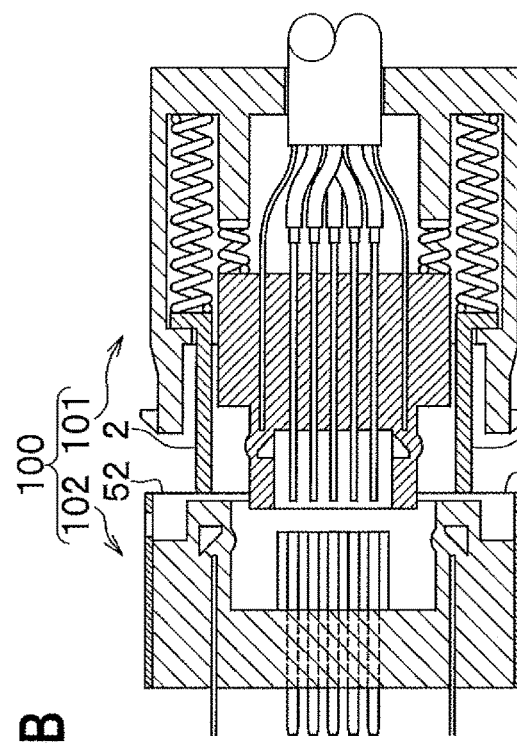

First, as shown in FIG. 6A, in the plug 101 in the non-insertion condition which is located to face the receptacle 102, the shutter 2 is urged from the rear by the resilient member 4 and abuts on a part of the case 5 from the rear to be latched together. Accordingly, the shutter 2 is located on the forefront in its movable range as the closed condition to cover the lenses 9 and the locating surfaces 10.

Figure 6B:
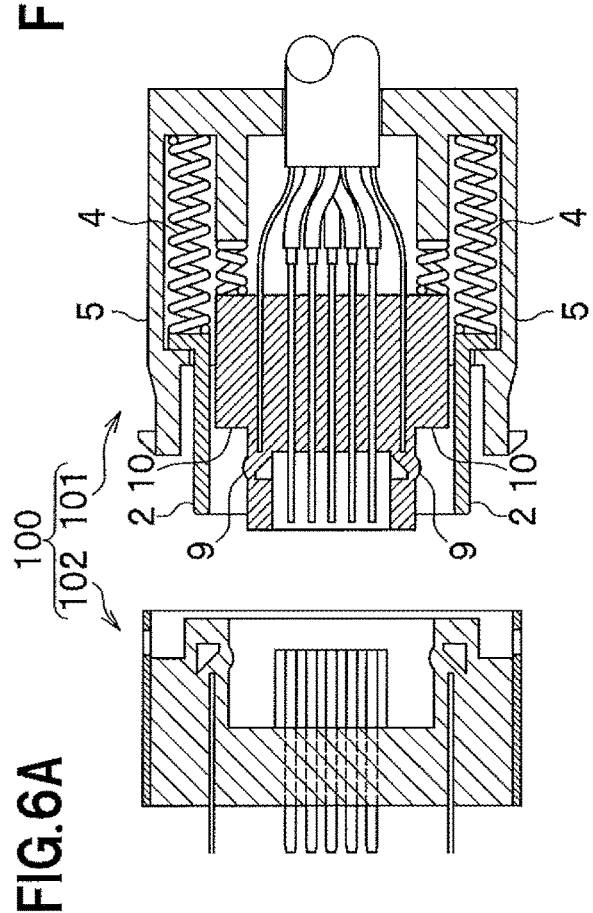

As shown in FIG. 6B, when the plug 101 starts to be inserted into the receptacle 102, the shutter 2 abuts on the insertion opening (rear end portion) of the case 52 of the receptacle 102.

Figure 6C:
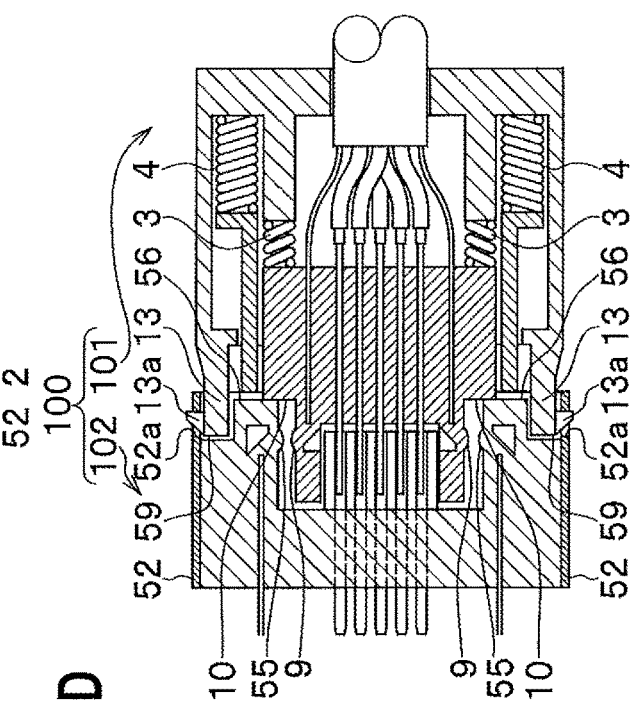

As shown in FIG. 6C, when the plug 101 is further pushed into the receptacle 102, the shutter 2 contracts the resilient member 4 against the urging force to be gradually brought into the open condition. When inserted until the locating surface 10 of the plug 101 abuts on the locating surface 56 of the receptacle 102, the optical axes of the lenses 9, 55 are aligned with each other. At this time, electrical connection between the electrical connection terminals 7a, 54a of the electrical connection units 7, 54 is completed. Moreover, the location post 13 is accepted into the location post accepting section 59 and starts to bow inward in the right-left direction.

Figure 6D:
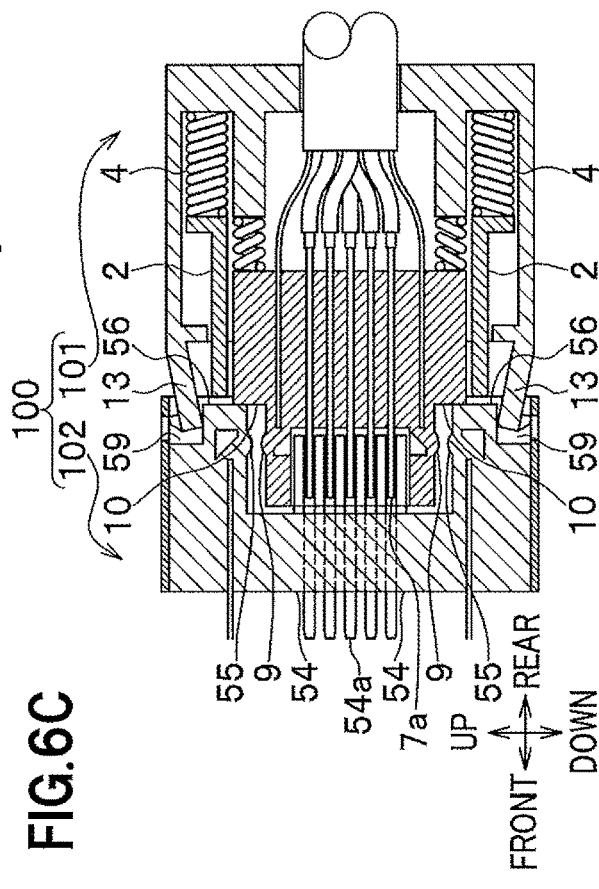

As shown in FIG. 6D, when the plug 101 is further pushed into the receptacle 102, the optical and electrical connection unit 1 contracts the resilient member 3 against the urging force. Then, the location post 13 is pushed into the location post accepting section 59 to allow the claw part 13a restored to its original state outward in the right-left direction through the hole 52a, to be engaged with the case 52. As a result, the plug 101 is held by the receptacle 102, preventing the plug 101 in the mating condition from coming free from the receptacle 102 by the resilient members 3, 4. Also, the rotational position around the axis in the front-rear direction of the lens 9 relative to the lens 55 is determined by the location post 13 and the location post accepting section 59. Moreover, the locating surface 10 resiliently contacts with the locating surface 56 by the resilient member 3, thus allowing the locating surfaces 10, 56 to adhere tightly to each other in the mating condition so as not to be separated from each other to form a gap, and allowing optical-axis alignment between the lenses 9, 55 to be reliably maintained in the mating condition.

Note that a distance between the lenses 9, 55 in the mating condition is determined by the location post 13 and the location post accepting section 59.

When the plug 101 is withdrawn from the receptacle 102, the location post 13 is pushed inward in the right-left direction to thereby release engagement of the claw part 13a with the hole 52a. Urging actions of the resilient members 3, 4 allow the mating condition to be smoothly released.

(Concrete Examples)

Next, description will be given of a concrete example of the structure of the connector 100 which embodies the above outline of the connector 100. A configuration embodied in the concrete example is partly different from the configuration shown in the outline of the connector 100 described above, and thus description focusing on the different configuration will be given below.

As shown in FIG. 7A, the case 5 of the plug 101 includes a pair of location posts 13 provided on the front surface of the case 5 and at both sides in the right-left direction of the shutter 2. The location posts 13 each extend frontward and each have an accommodation section 14 that is open to the outside in the right-left direction and formed into a U-shape when viewed from the front. Each of the accommodation sections 14 accommodates a front portion of a plate-like holding part 15 (plug-side holding part) that is bent to be able to bow in the right-left direction. The front portion of the holding part 15 is visible from the outside and the other portions (see FIG. 8) of the holding part 15 are disposed within the case 5. The front portion of the holding part 15 has a hole 15a (plug-side holding part) formed to pass through in the thickness direction. The hole 15a is a section with which a claw part 63 (receptacle-side holding part) (see FIGS. 10A and 10B) is engaged, the claw part 63 being formed on right and left inner wall portions of the case 52 of the receptacle 102.

As shown in FIG. 7B, the shutter 2 abuts on a part of the insertion opening (rear end portion) of the case 52 (metal shell) of the receptacle 102, and is accommodated in the case 52 in the mating condition. At this time, the claw part 63 is engaged with the hole 15a.

(Concrete Example of Structure of Plug 101)

As shown in FIG. 8, the shutter 2 is provided with the flange 2a extending outward in the right-left direction at the rear end portion thereof. The flange 2a has a function of receiving the resilient member 4 from the rear, and a function of abutting the accommodation section 14 to prevent the shutter 2 from popping out of the case 5.

The optical and electrical connection unit 1 is provided with the electrical connection unit 7 located centrally in the right-left direction thereof, and the optical connection units 6 disposed at both sides in the right-left direction of the electrical connection unit 7. The electrical connection unit 7 is integrally formed with the pair of optical connection units 6. Accordingly, the entire optical and electrical connection unit 1 is urged from the rear by two resilient members 3. For this purpose, the resilient members 3 each have an urging force necessary to cause the electrical connection unit 7 to smoothly slide on the electrical connection unit 54 (FIG. 10B) of the receptacle 102 to allow the locating surface 10 to reach the locating surface 56 of the receptacle 102.

As shown in FIG. 8, FIG. 9A and FIG. 9B, an outer shape of the optical and electrical connection unit 1 is the same as an outer shape of an electrical connection unit used in a plug for electric transmission (e.g., micro USB 2.0) which is widely prevalent and well known.

The optical and electrical connection unit 1 is surrounded by a metallic outer shell part 16. The outer shell part 16 is detachably attached to the optical and electrical connection unit 1 and protects the electrical connection terminals 7a which are open to the upper side. The outer shell part 16 is surrounded by the shutter 2.

Figure 11A:
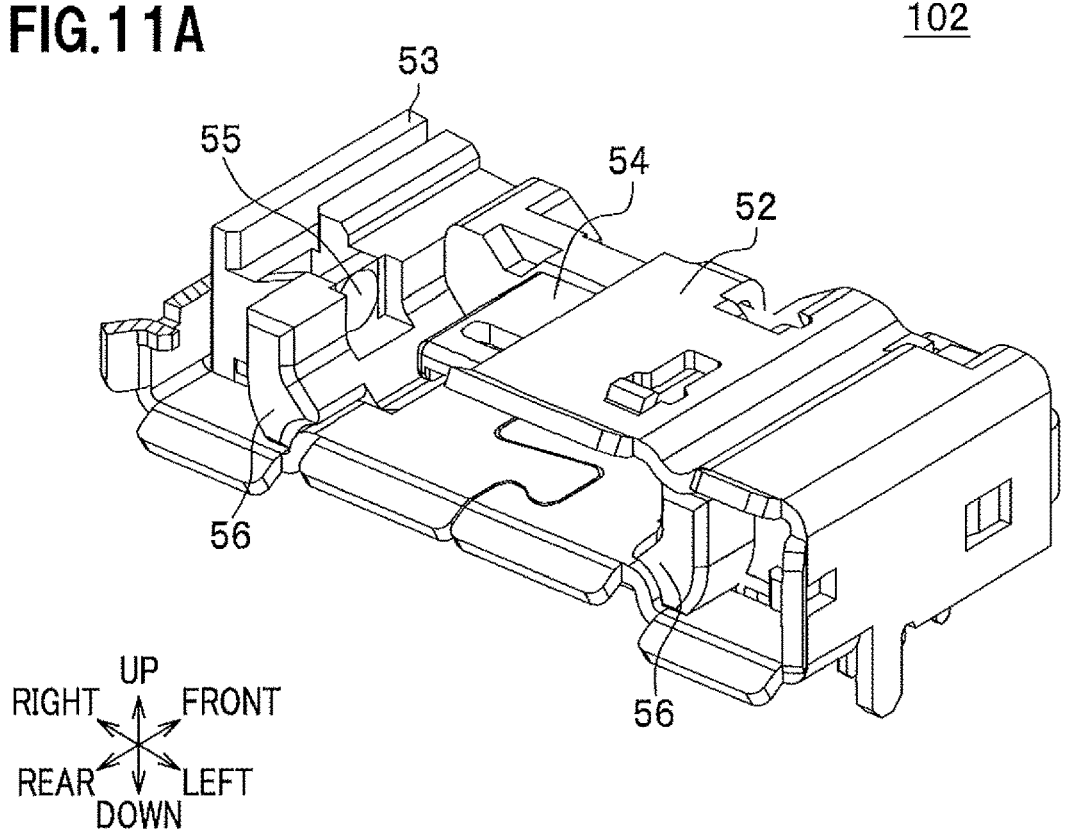

Both sides in the right-left direction of the outer shell part 16 are partially cut out to allow the lenses 9 to be exposed. Accordingly, the outer shell part 16 does not impede the side surface coupling between the lens 9 and the lens 55 (FIG. 11A).

Note that exposure direction of the lens 9 can be arbitrarily designed by cutting out a part of the outer shell part 16 depending on the position of each lens 9 to be exposed.

As shown in FIG. 9B, the locating surface 10 is formed on the side surface of the optical connection unit 6 and located at the rear relative to the lens 9, and faces to the front. In the mating condition, the locating surface 10 abuts on the locating surface 56 (FIGS. 10A and 10B) of the optical connection unit 53 in the receptacle 102. Moreover, since the locating surface 10 is formed to extend downward, designing such that the inner wall of the shutter 2 comes close to the lens 9 can be conducted, as compared to the case where the locating surface 10 is formed to extend outward in the right-left direction. As a result, a possibility that foreign materials enter the space between the shutter 2 in the closed condition and the lenses 9 can be decreased. Note that the area of the locating surface 10 is approximately 0.2 mm$^2$ and very small, thus making it possible to decrease a possibility that foreign materials adhere on the locating surface 10.

(Concrete Example of Structure of Receptacle 102)

Figure 10A:
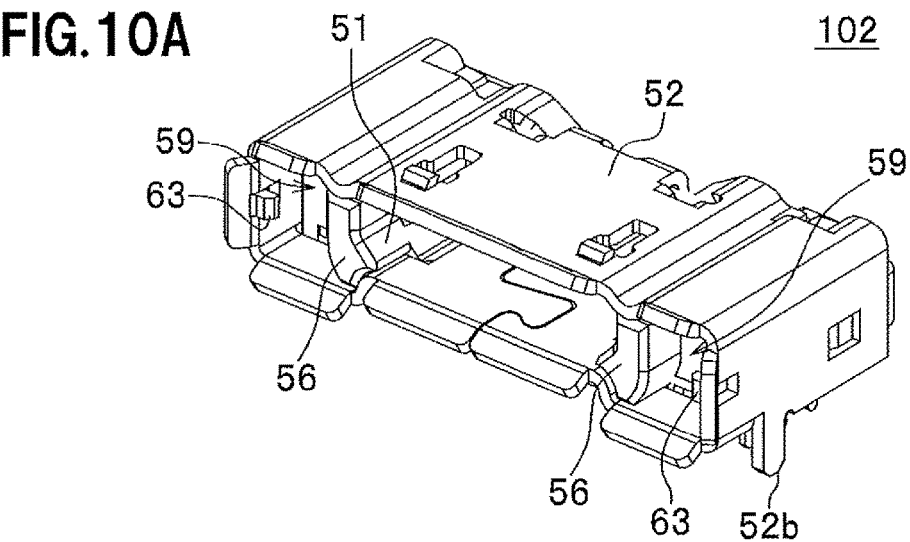

As shown in FIG. 10A, the receptacle 102 according to the present concrete example is for substrate mounting and has leg parts 52b extending downward from the case 52, which are attached and fixed to a substrate not shown. The optical and electrical connection unit 51 is attached on the inside of the receptacle 102 and forms an accepting section of the plug 101 in the case 52 at the center thereof in the right-left direction. Also, the optical and electrical connection unit 51 forms the pair of location post accepting sections 59 on the outside thereof in the right-left direction and on the inside of the case 52.

Figure 10B:
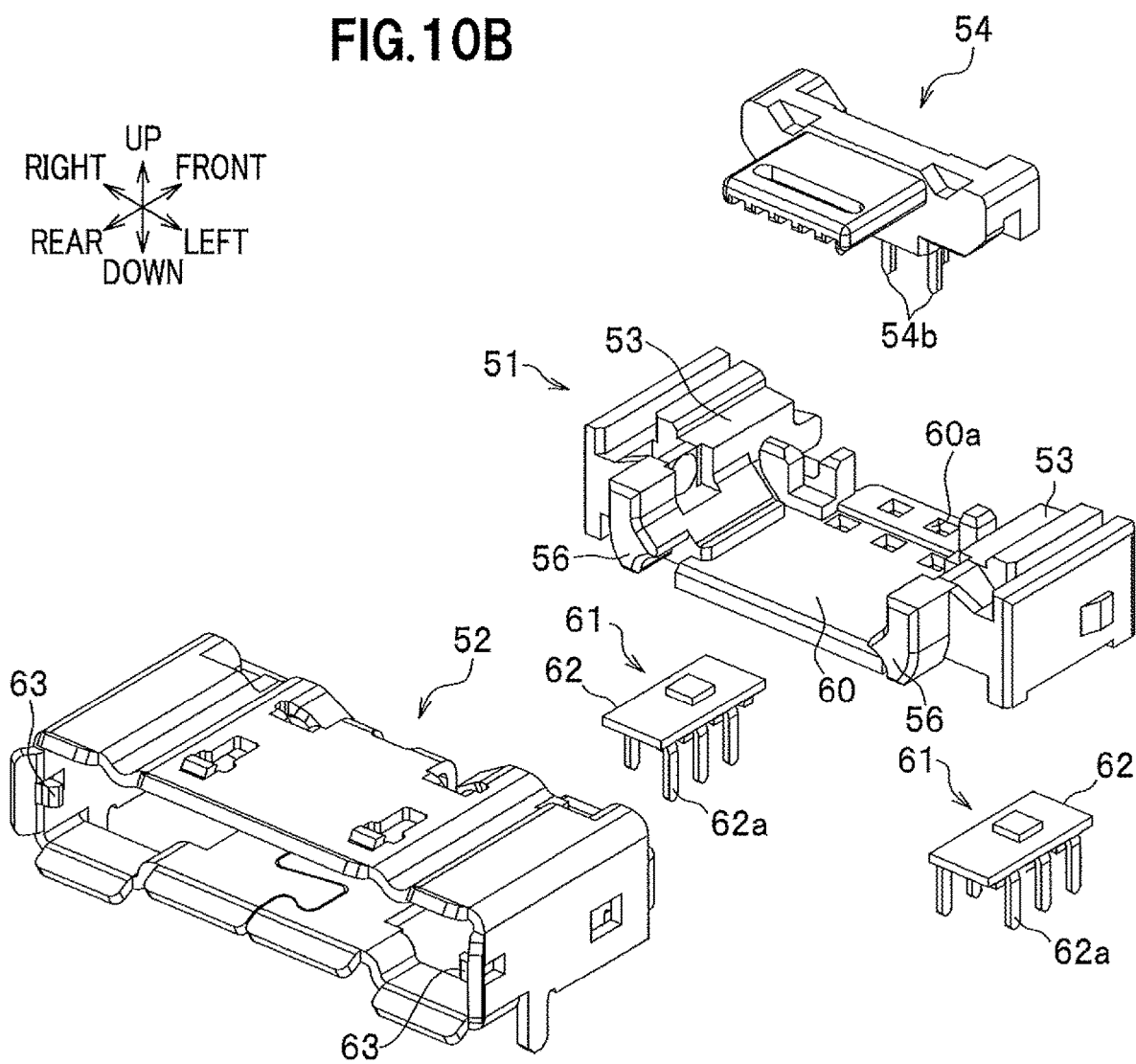

As shown in FIG. 10B, two optical connection units 53 and one electrical connection unit 54 provided in the optical and electrical connection unit 51 are separately formed from each other. Each of the two optical connection units 53 is connected to both sides in the right-left direction of a support plate 60. The support plate 60 is a member provided in the optical and electrical connection unit 51.

Formed in the support plate 60 are holes 60a through which leg parts 54b extending downward from the body of the electrical connection unit 54 are inserted. The leg parts 54b are inserted through the holes 60a to thereby allow the electrical connection unit 54 to be attached to the optical connection units 53. The leg parts 54b inserted through the holes 60a are attached and fixed to the substrate not shown. The optical and electrical connection unit 51 is incorporated into the receptacle 102 in the state where the optical connection units 53 and the electrical connection unit 54 are housed within the case 52 and the support plate 60 constitutes the underside of the receptacle 102.

The receptacle 102 in the present concrete example does not use any fiber (the fibers 58 shown in FIGS. 2A to 2D), but is provided with light conversion elements 61. Formed in a lower part of each optical connection unit 53 is a recess (not shown) in which the light conversion element 61 is accommodated, and a support base 62 on which the light conversion element 61 is supported can be attached, from below, to each optical connection unit 53 housed within the case 52. Leg parts 62a extending downward from the support base 62 are attached and fixed to the substrate not shown.

The light conversion element 61 that is accommodated in the optical connection unit 53 for transmission is provided with a light emitting element on the support base 62, converts an electric signal routed through the substrate into an optical signal, and applies light emitted from the light emitting element upward in the mating condition. The light emitted from the light emitting element is transmitted through the optical path conversion part 57 (FIGS. 2A to 2D) provided on the optical connection unit 53, inward in the right-left direction toward the lens 55, thereby allowing optical connection between the lenses 9, 55 to be realized. Note that, although in the example of FIGS. 2A to 2D the optical path is converted between the front-rear direction and the right-left direction, the optical path in the present concrete example is converted between the front-rear direction and the up-down direction.

The light conversion element 61 that is accommodated in the optical connection unit 53 for reception is provided with a light receiving element on the support base 62. In the mating condition, the light transmitted outward in the right-left direction from the lens 55 through the optical connection between the lenses 9, 55 is transmitted downward through the optical path conversion part 57, and received at the light receiving element to be converted into an electric signal. This electric signal is routed through the substrate to be transmitted to a predetermined electronic circuit element.

Note that, although the receptacle 102 in the present concrete example includes the optical connection units 53 for transmission and for reception, respectively, a configuration can also be adopted such that one optical connection unit 53 is provided with functions for transmission and for reception.

As shown in FIG. 11A, the locating surface 56 forms a part of the rear surface of the optical connection unit 53 and is integrally formed with the optical connection unit 53. Upon insertion of the plug 101, the locating surface 10 of the plug 101 abuts on the locating surface 56. Moreover, the locating surface 56 is located at the rear relative to the lens 55 and disposed near the insertion opening (rear end portion) of the receptacle 102. Consequently, foreign materials having adhered on the locating surface 56 can be easily removed.

Figure 11B:
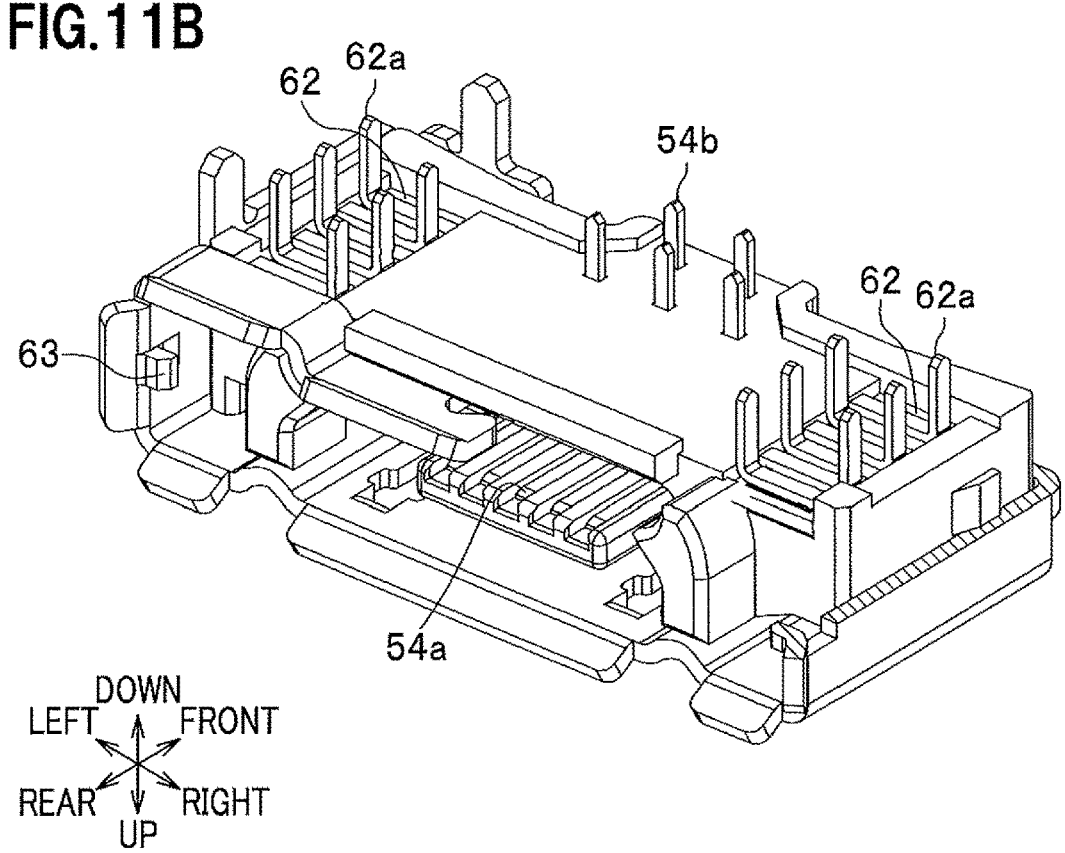

As shown in FIG. 11B, FIGS. 10A and 10B, the case 52 has the claw parts 63 formed on rear parts of right and left inner plates thereof, each of the claw parts 63 being engaged with the hole 15a (FIG. 8) of the holding part 15 of the plug 101 in the mating condition. Moreover, the support base 62 of the light conversion element 61 together with the support plate 60 constitutes the underside of the receptacle 102.

Figure 12A:
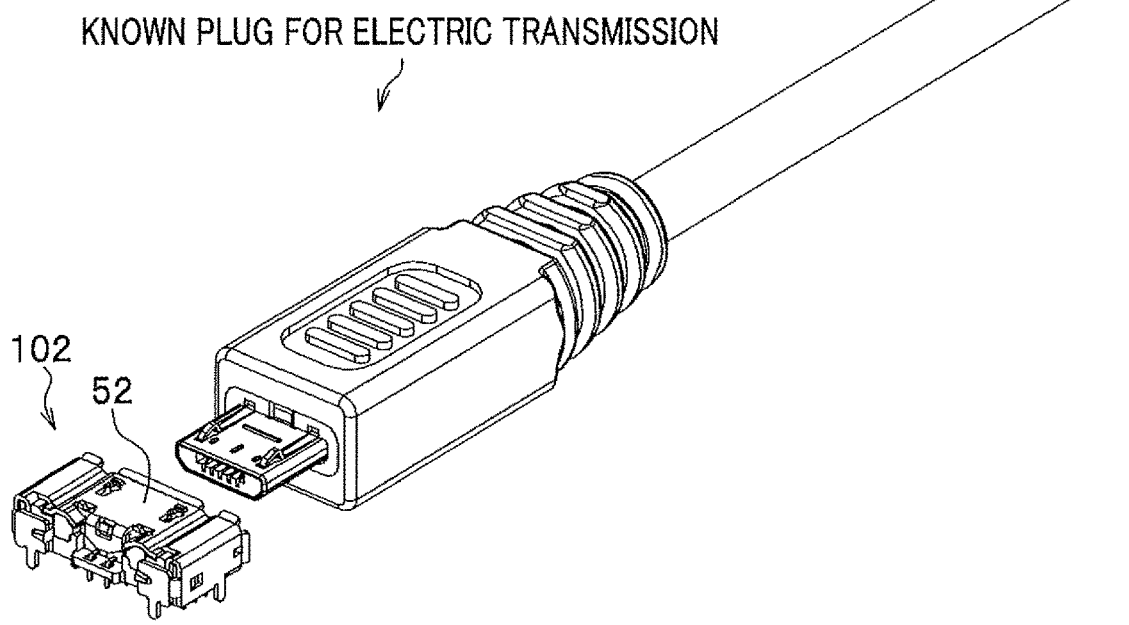
Figure 12B:
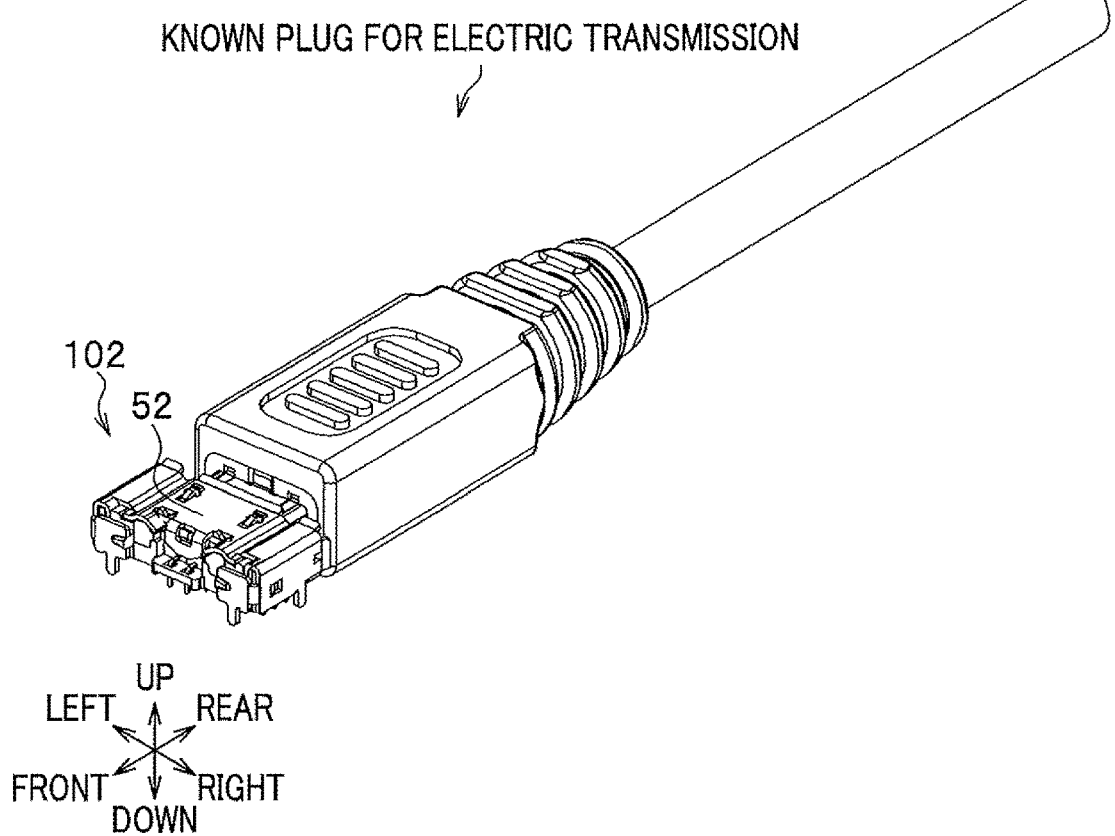

The accepting section of the plug 101, which is centrally formed within the case 52 of the receptacle 102 in the present concrete example, can also accept a plug for electric transmission which is widely prevalent and well known, which is shown in FIG. 12A. That is, in the mating condition shown in FIG. 12B, the optical connection units 53 of the receptacle 102 do not impede electrical connection between the electrical connection unit in the well-known plug and the electrical connection unit 54 in the receptacle 102. Accordingly, the connector 100 according to the present embodiment can be given compatibility with the well-known plug so that a plug that performs only electrical transmission can also be used in the connector 100 according to the present embodiment that performs both optical transmission and electrical transmission. As a result, a range of use of the connector 100 according to the present embodiment can be widened.

Figure 13A:
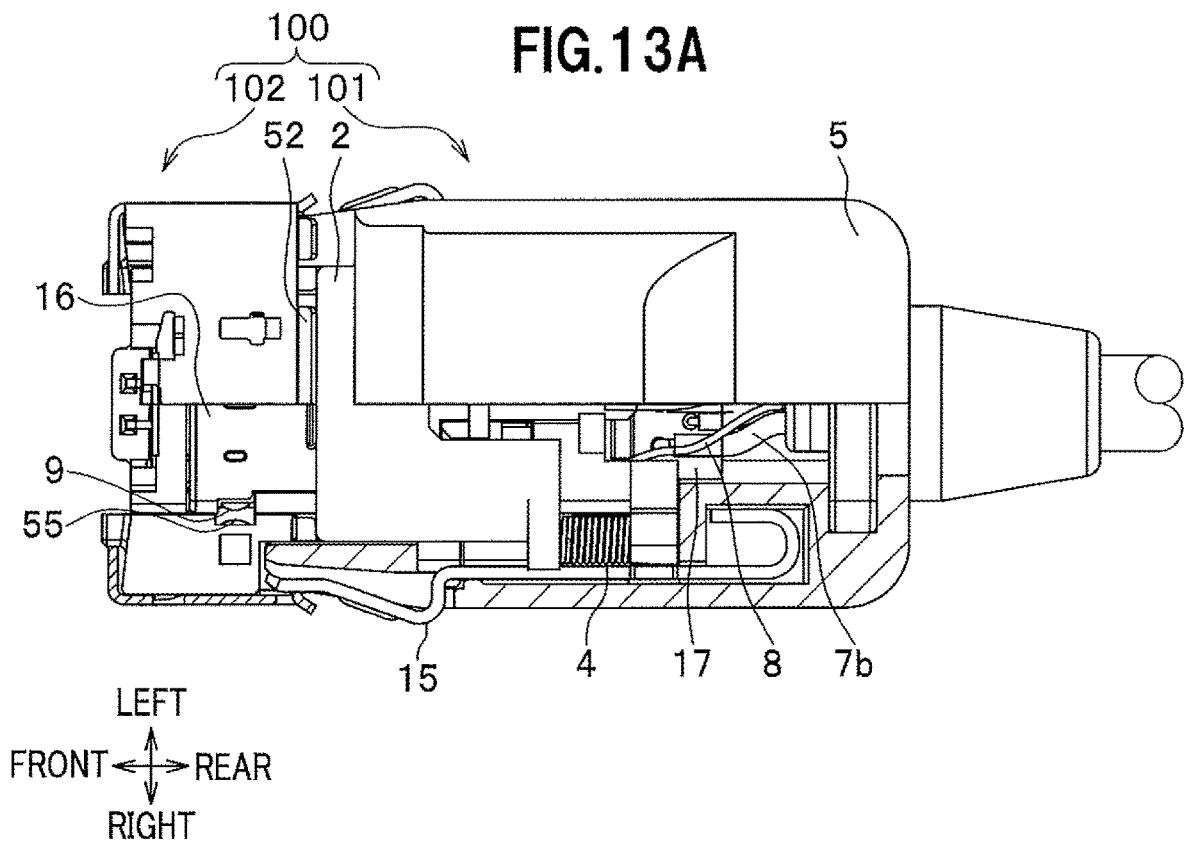
Figure 13B:
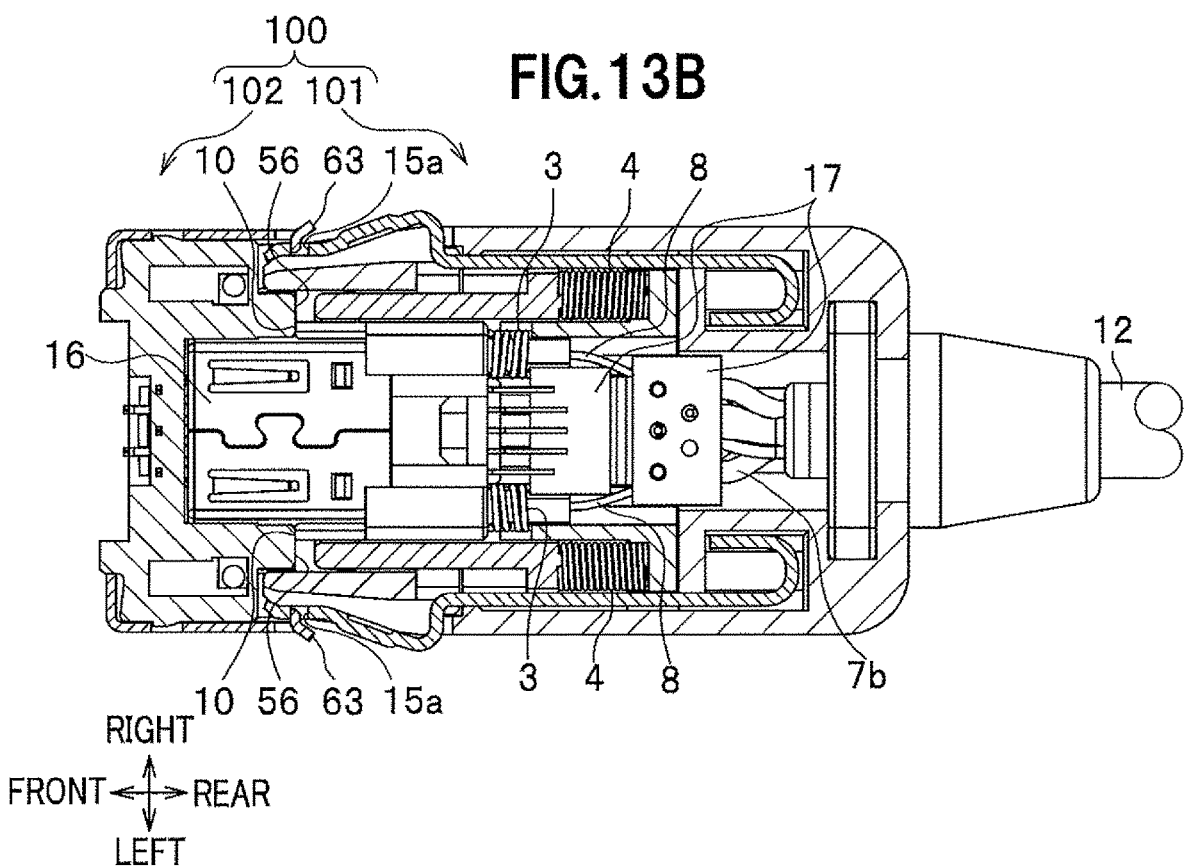

As shown in FIG. 13A and FIG. 13B, the resilient members 3 urge the optical and electrical connection unit 1 frontward in the mating condition, thus allowing the state in which optical-axis alignment in the front-rear direction between the lenses 9, 55 is established to be maintained. The plug 101 is provided with a substrate 17 that is provided at the rear of the optical and electrical connection unit 1 and adapted to relay the electrical connection terminals 7a of the electrical connection unit 7 to the electrical wires 7b. The substrate 17 is a rigid flexible substrate, and a flexible portion centrally located in the front-rear direction of the substrate 17 is bent into an inverse U shape when viewed in the right-left direction (see FIG. 8). Since the optical and electrical connection unit 1 that resiliently contacts with the resilient member 3 is displaced in the front-rear direction, connecting parts of the electrical wires 7b and the fibers 8 to the optical and electrical connection unit 1 are also displaced accordingly. At this time, the flexible portion of the substrate 17 deforms depending on displacement of the electrical wires 7b and the fibers 8 deform due to their flexibility, thus allowing displacement of the optical and electrical connection unit 1 to be smoothly carried out.

Another Embodiment

The plug 101 according to another embodiment will be described focusing on points which are different from the plug 101 (FIG. 8, FIGS. 9A and 9B) according to the embodiment described above.

Figure 14:
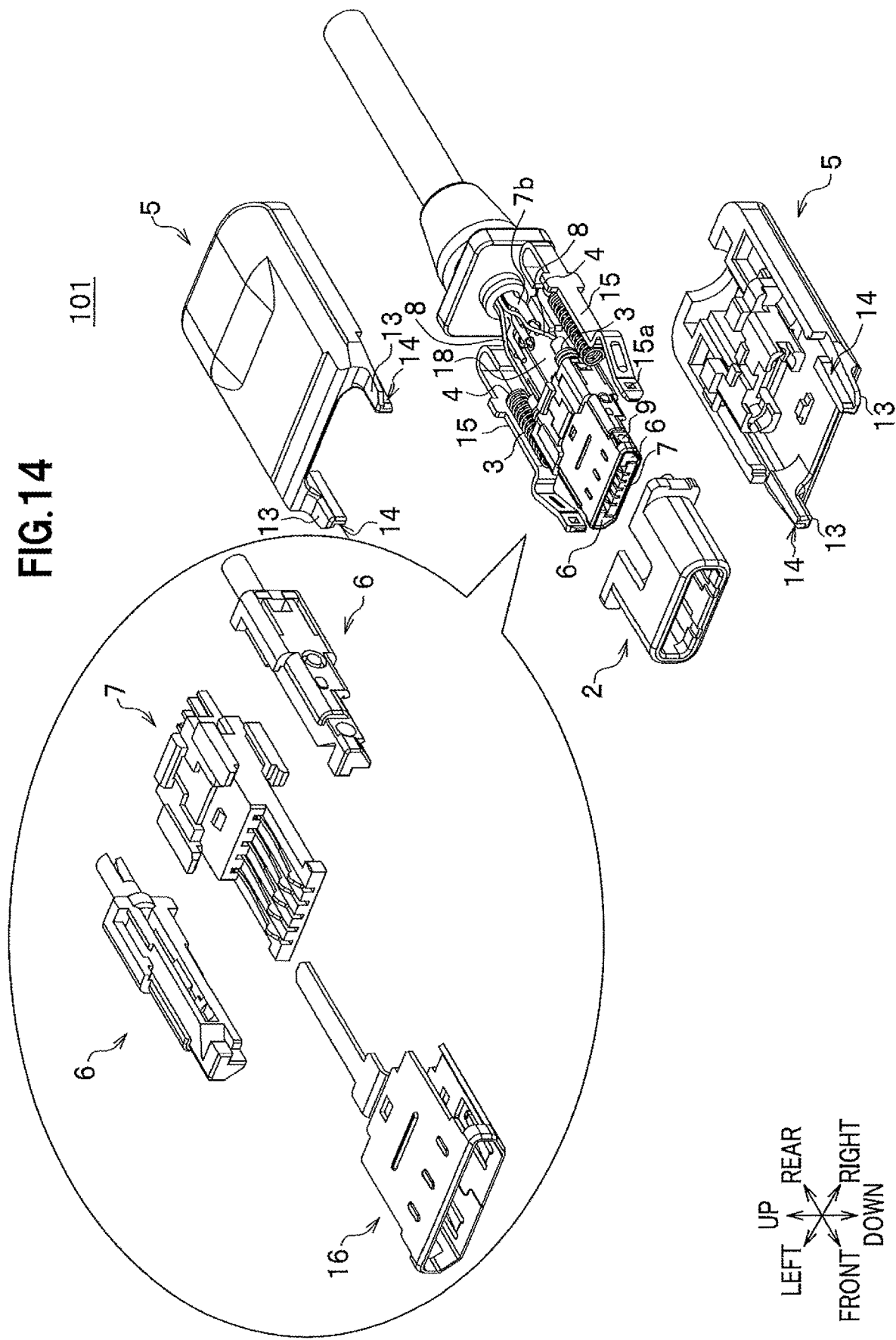
FIG. 14 is an exploded perspective view of a plug according to another embodiment.

As shown in FIG. 14, each of two optical connection units 6, and one electrical connection unit 7, which are provided in the plug 101 according to another embodiment, are separately formed from each other. The resilient member 3 abuts on the rear end portion of the optical connection unit 6. The optical connection units 6 and the electrical connection unit 7 are separately formed from each other, thus making it possible to individually manufacture each of the optical connection units 6 and the electrical connection unit 7. This manufacturing is easier than the manufacturing of the optical and electrical connection unit 1 in which the optical connection units 6 and the electrical connection unit 7 are integrally formed with each other.

Figure 15A:
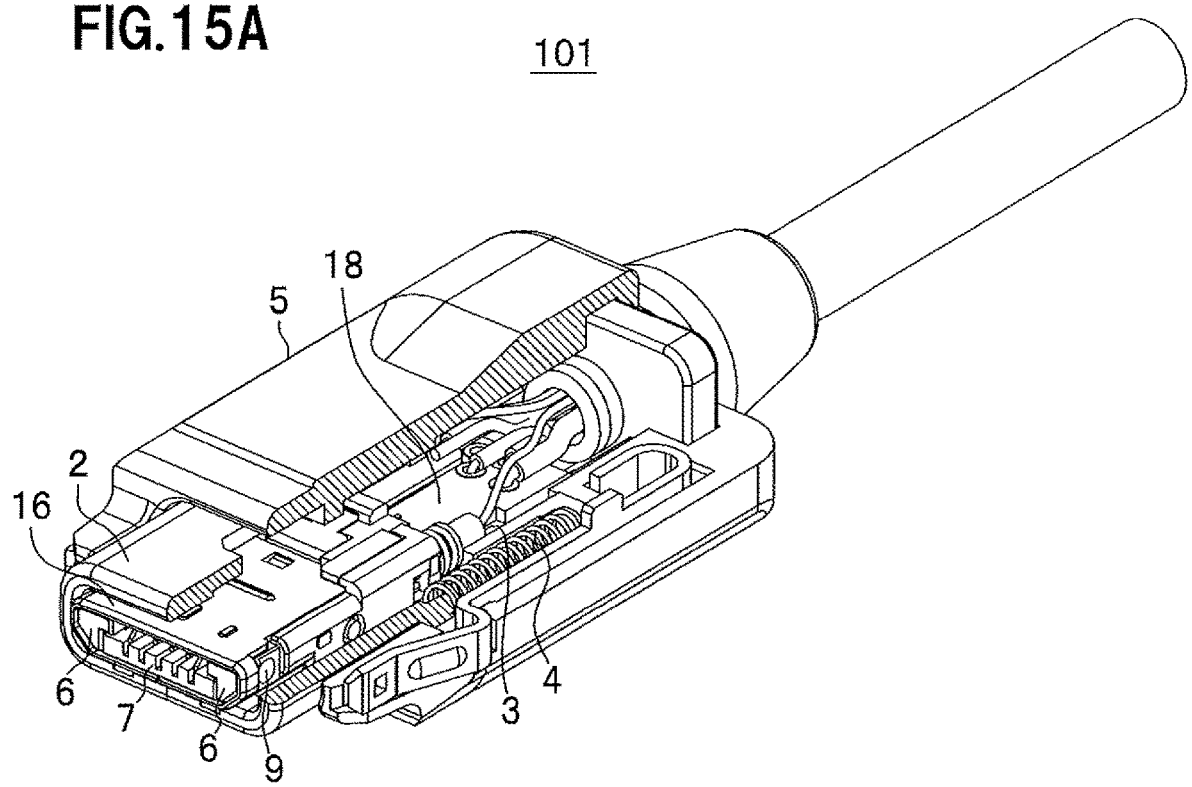
Figure 15B:
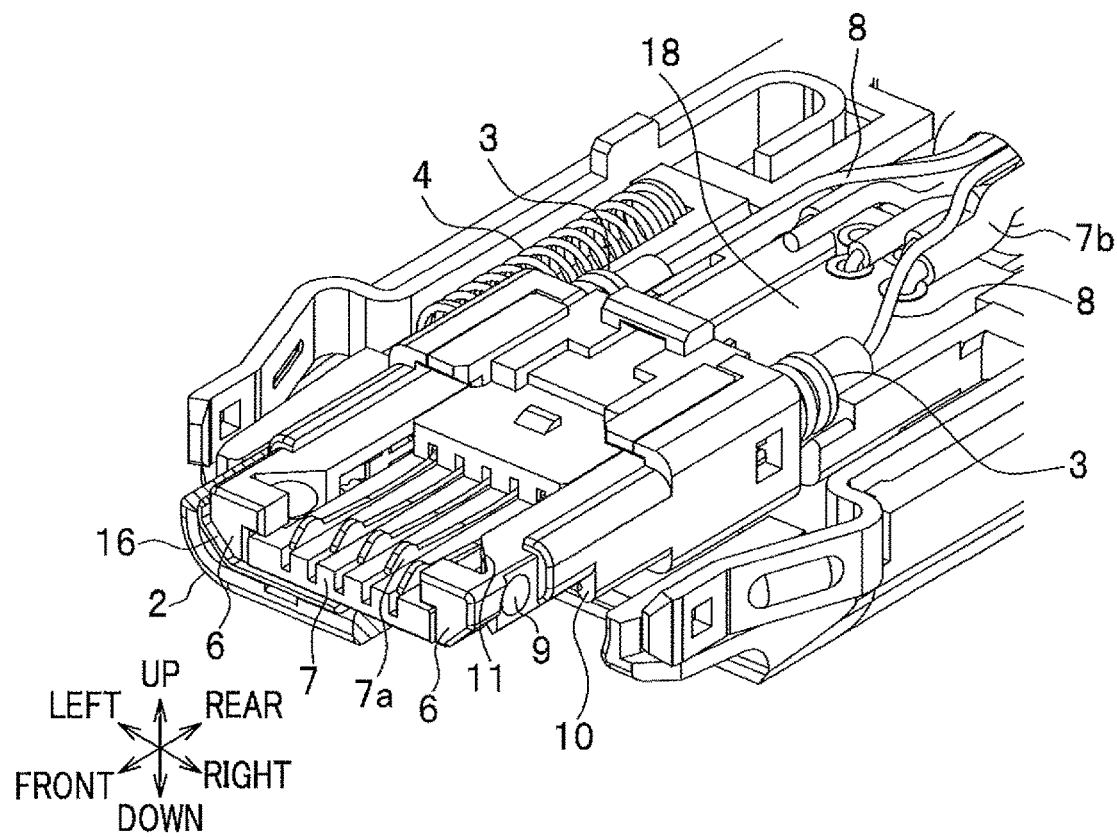

As shown in FIG. 15B, the locating surface 10 is formed on the side surface of the optical connection unit 6 in the same manner as in the plug 101 according to the embodiment described above. That is, the locating surface 10 is integrally formed with the optical connection unit 6. Accordingly, misalignment of the optical axis in the inserting/removing direction can be minimized as described above.

As shown in FIG. 14, the optical connection units 6 are each attached to the outside in the right-left direction of the electrical connection unit 7. The optical connection units 6 and the electrical connection unit 7 have a structure assembled with a state engaged with each other so as to be slidable in the front-rear direction on each other's contact surfaces and not to be removable in the right-left direction. When performing the locating of the plug 101 in the mating condition (state shown in FIG. 6D), the urging force by the resilient members 3 acts on only the optical connection units 6 and does not act on the electrical connection unit 7. Accordingly, in order to allow optical-axis alignment between the lenses 9, 55 in the mating condition to be reliably realized, the resilient members 3 have an urging force necessary to move only the optical connection units 6. This urging force is smaller than the urging force which is necessary to move the entire optical and electrical connection unit 1 in order to allow electrical connection between the electrical connection terminals 7a of the plug 101 and the electrical connection terminals 54a of the receptacle 102 to be reliably realized as in the plug 101 according to the embodiment described above. Moreover, the right-left two optical connection units 6 are movable in the front-rear direction independently of each other, thus making it possible to absorb variability in fore-and-aft positions of the optical connection units 53 of the receptacle 102 (variability in fore-and-aft positions of the optical axes), which is generated due to an assembly tolerance or the like, and thus to realize the optical-axis alignment with a further high degree of accuracy. Herein, where a part having a laterally same shape is used as an optical part (a part for performing optical transmission) to allow an integral molded part by means of a mold to be further applied thereto, demerits in terms of cost associated with the need of two parts can be reduced.

As shown in FIGS. 15A and 15B, a substrate 18 provided in the plug 101 according to another embodiment is adapted to relay the electrical connection terminals 7a of the electrical connection unit 7 to the electrical wires 7b in the same manner as the substrate 17 provided in the plug 101 according to the embodiment described above. The substrate 18 is not a rigid flexible substrate, but a plate-like body. The optical connection units 6 can be moved in the front-rear direction independently of the electrical connection unit 7 because they are separately formed from the electrical connection unit 7. Accordingly, while the optical connection units 6 require moving in the front-rear direction to some extent for the locating (FIG. 6D) of the plug 101 in the mating condition, the electrical connection unit 7 does not require moving in the front-rear direction. Therefore, the electrical connection unit 7 can be mounted on the substrate 18 having no flexible portion and thus fixed to the entire plug 101.

Conclusions

According to each embodiment described above, the locating surface 10 disposed on the side surface of each optical connection unit 6 is small in its area, and in terms of the structure of the plug 101 and the receptacle 102, foreign materials are hardly accumulated on the locating surface 10, thus being hardly subject to influence by misalignment of the optical axis due to the foreign materials.

Accordingly, the connector 100 adapted to perform optical transmission can be provided, which prevents adhesion of foreign materials without taking cumbersome measures against foreign materials, thereby improving accuracy of optical-axis alignment between the plug 101 and the receptacle 102 and allowing even any person other than a person with ordinary skill in the art to easily use the connector.

Moreover, according to each embodiment, the locating surface 56 disposed on the side surface of each optical connection unit 53 is small in its area, and in terms of the structure of the plug 101 and the receptacle 102, foreign materials are hardly accumulated on the locating surface 56, thus being hardly subject to influence by misalignment of the optical axis due to the foreign materials.

Accordingly, the connector 100 adapted to perform optical transmission can be provided, which prevents adhesion of foreign materials without taking cumbersome measures against foreign materials, thereby improving accuracy of optical-axis alignment between the plug 101 and the receptacle 102 and allowing even any person other than a person with ordinary skill in the art to easily use the connector.

Also, the plug 101 is provided with the shutter 2 and the resilient members 4, thereby making it possible to allow protection of the lenses 9 in the non-insertion condition, and opening and closing of the shutter 2 that assists in the optical connection between the lenses 9, 55 in the mating condition, to be automatically realized by only insertion/removal of the plug 101.

Further, in the plug 101 that performs the side surface coupling, the locating surface 10 provided on the optical connection unit 6 is integrally formed with the optical connection unit 6. Consequently, misalignment of the optical axis in the inserting/removing direction can be minimized.

Moreover, the plug 101 is provided with the resilient members 3 and the constituent elements (claw parts 13a, holding parts 15, and holes 15a) for holding the plug 101 in the receptacle 102, thereby making it possible, with respect to the lenses 9 of the optical connection units 6 that are resiliently supported by the resilient members 3, to maintain misalignment of the optical axis between the lenses 9, 55 in the mating condition to the minimum at all times.

Furthermore, where the plug 101 is provided with the electrical connection unit 7, the optical connection units 6 are disposed outside the electrical connection unit 7 in the right-left direction, thereby making it possible to realize a reduction in profile of the plug 101.

Additionally, as described in another embodiment, the optical connection units 6 and the electrical connection unit 7 in the plug 101 are separately formed from each other, thereby making it possible to facilitate manufacturing of the optical connection unit 6 integral with the locating surface 10 and manufacturing of the electrical connection unit 7 and thus to facilitate manufacturing of the plug 101.

Also, in the receptacle 102, the locating surface 56 provided on the optical connection unit 53 is located at the rear relative to the lens 55, thereby allowing the locating surface 56 to be disposed near the insertion opening (rear end portion) of the case 52. Therefore, even if foreign materials adhere on the locating surface 56, the foreign materials can be easily removed.

Further, in the receptacle 102 that performs the side surface coupling, the locating surface 56 provided on the optical connection unit 53 is integrally formed with the optical connection unit 53. Consequently, misalignment of the optical axis in the inserting/removing direction can be minimized.

Moreover, the receptacle 102 is provided with the constituent elements (holes 52a, and claw parts 63) for holding the plug 101 in the receptacle 102, thereby making it possible, with respect to the lenses 55 facing the lenses 9 of the optical connection units 6 that are resiliently supported by the resilient members 3, to maintain misalignment of the optical axis between the lenses 9, 55 in the mating condition to the minimum at all times.

Furthermore, where the receptacle 102 is provided with the electrical connection unit 54, the optical connection units 53 are disposed outside the electrical connection unit 54 in the right-left direction, thereby making it possible to realize a reduction in profile of the receptacle 102.

Additionally, as described in the concrete example (FIG. 10B, etc.) of the first embodiment, the optical connection units 53 and the electrical connection unit 54 in the receptacle 102 are separately formed from each other, thereby making it possible to facilitate manufacturing of the optical connection unit 53 integral with the locating surface 56 and manufacturing of the electrical connection unit 54 and thus to facilitate manufacturing of the receptacle 102.

Others

The above embodiments have been described with respect to the optical/electrical hybrid connector, by way of example. However, the present invention can also be applied to an optical connector that performs only optical transmission.

Also, description has been given of the side surface coupling realized in the connector 100 in the above embodiments, by providing the optical path conversion parts 11 in the plug 101 and providing the optical path conversion parts 57 in the receptacle 102. However, the side surface coupling can also be realized, for example, by bending the fibers 8 held in the plug 101 at 90 degrees to direct the head of each fiber 8 to the lens 9 and bending the fibers 58 held in the receptacle 102 at 90 degrees to direct the head of each fiber 58 to the lens 55.

Moreover, in the plug 101 in the above embodiments, the locating surface 10 is located at the rear relative to the lens 9, and in the receptacle 102 in the above embodiments, the locating surface 56 is located at the rear relative to the lens 55 (FIG. 3). However, in the plug 101, the locating surface 10 may be located at the front relative to the lens 9, and in the receptacle 102, the locating surface 56 may be located at the front relative to the lens 55.

Furthermore, the plug 101 in the above embodiments has been described with respect to a columnar body whose outer and front shape is nearly a rectangular shape, by way of example. However, the present invention can also be applied to a columnar body whose outer shape is a circular shape, an elliptical shape (two-core type), or a polygonal shape.

Also, in the above embodiments, upon insertion of the plug 101, the shutter 2 abuts on the insertion opening of the case 52 of the receptacle 102, and the rear end face of the optical and electrical connection unit 51, namely the locating surface 56 is disposed at the front side relative to the insertion opening (FIG. 3). However, a configuration may be adopted in which the locating surface 56 of the optical and electrical connection unit 51 is disposed at the rear side relative to the insertion opening to protrude from the case 52. In this case, upon insertion of the plug 101, the shutter 2 abuts on the locating surface 56.

Further, the above embodiments have been described with respect to the case where the claw part 13*a* is disposed on the location post 13 that extends frontward from the front surface of the case 5 of the plug 101, and the location post 13 bows inward in the right-left direction to realize the mating condition (FIG. 6C). However, for example, a structure can also be adopted such that the claw part 13*a* is pressed with a user's hand into the location post 13 to allow the claw part 13*a* to recede into the location post 13 and the hand is released from the claw part 13*a* to allow the claw part to pop out of the location post 13 to return to its original position. This structure makes it possible to realize the mating condition by movement of the claw part 13*a* into and out of the location post 13 without allowing the location post 13 to bow.

Moreover, in the above embodiments, description has been given of the example in which introduced into the receptacle 102 is the configuration in which no fiber is used but the light conversion element 61 is used by way of example and photoelectric conversion is performed within the receptacle 102 (FIGS. 10A and 10B). However, the configuration can also be introduced into the plug 101.

Furthermore, in another embodiment of the above embodiments, description has been given of the configuration in which two optical connection units 6 and one electrical connection unit 7 provided in the plug 101 are separately formed from each other (FIG. 14). In this case, taking into account that the two optical connection units 6 are slidable in the front-rear direction independently of each other, with respect to two optical connection units 53 connected via the support plate 60 to each other in the receptacle 102, the indirect connected state between the two optical connection units 53 may be released, for example, by severing or eliminating the support plate 60. Even in that case, in the mating condition, the lenses 9, 55 face each other to allow the optical-axis alignment to be carried out with a high degree of accuracy between one optical connection unit 6 and one optical connection unit 53 that faces the one optical connection unit 6. Moreover, the lenses 9, 55 face each other to allow the optical-axis alignment to be carried out with a high degree of accuracy between the other optical connection unit 6 and the other optical connection unit 53 that faces the other optical connection unit 6.

In addition, a technique that appropriately combines various techniques explained in the above embodiments can also be realized.

Other forms, materials and functions of the constituent elements of the present invention can be appropriately modified within the scope not departing from the gist of the present invention.

REFERENCE SIGNS LIST

100 Connector
101 Plug
102 Receptacle
1 Optical and electrical connection unit (Plug-side optical connection unit and plug-side electrical connection unit)
2 Shutter
2*a* Flange
3 Resilient member (Second urging part)
4 Resilient member (First urging part)
5 Case
6 Optical connection unit (Plug-side optical connection unit)
7 Electrical connection unit (Plug-side electrical connection unit)
7*a* Electrical connection terminal
7*b* Electrical wire
8 Fiber
9 Lens (Plug-side optical connection part)
10 Locating surface (Plug-side locating part)
11 Optical path conversion part
12 Cable
13 Location post
13*a* Claw part (Plug-side holding part)
14 Accommodation section
15 Holding part (Plug-side holding part)
15*a* Hole (Plug-side holding part)
16 Outer shell part
17 Substrate (Rigid flexible substrate provided in the plug)
18 Substrate (Substrate provided in a plug in another embodiment)
51 Optical and electrical connection unit (Receptacle-side optical connection unit and receptacle-side electrical connection unit)
52 Case
52*a* Hole (Receptacle-side holding part)
52*b* Leg part
53 Optical connection unit (Receptacle-side optical connection unit)
54 Electrical connection unit (Receptacle-side electrical connection unit)
54*a* Electrical connection terminal
54*b* Leg part
55 Lens (Receptacle-side optical connection part)
56 Locating surface (Receptacle-side locating part)
57 Optical path conversion part
58 Fiber
59 Location post accepting section
60 Support plate
60*a* Hole
61 Light conversion element
62 Support base
62*a* Leg part
63 Claw part (Receptacle-side holding part)

The invention claimed is:

1. A plug of a connector adapted to perform optical transmission,
the plug comprising a plug-side optical connection unit that is adapted to perform optical connection with a receptacle-side optical connection part provided in a receptacle of the connector,
the plug-side optical connection unit including:
a plug-side optical connection part that is provided on a side surface of the plug-side optical connection unit and adapted to perform optical connection with the receptacle-side optical connection part in a direction orthogonal to an inserting/removing direction of the plug; and
a plug-side locating part that is provided on the side surface of the plug-side optical connection unit and adapted to abut on a receptacle-side locating part of the receptacle to determine a position of the plug-side optical connection unit in a mating condition of the plug and the receptacle; and further comprising
a shutter that is adapted to move in the inserting/removing direction along the side surface of the plug-side optical connection unit, and
a first urging part that is adapted to urge the shutter in the inserting direction of the plug, wherein
the shutter covers the plug-side optical connection part in a closed condition thereof and allows the plug-side optical connection part to be exposed in an open condition thereof.

2. The plug according to claim 1, wherein
the plug-side locating part and the plug-side optical connection unit are integrally formed with each other.

3. The plug according to claim 1, further comprising:
a second urging part that is adapted to urge the plug-side optical connection unit in the inserting direction of the plug; and
a plug-side holding part that is adapted to hold the plug in the receptacle in the mating condition while allowing the plug-side locating part to abut on the receptacle-side locating part by means of the second urging part.

4. The plug according to claim 1, further comprising
a plug-side electrical connection unit that has a plurality of electrical connection terminals arranged side by side in a width direction thereof, wherein
the plug-side optical connection unit is disposed outside the plug-side electrical connection unit in the width direction.

5. The plug according to claim 4, wherein
the plug-side optical connection unit and the plug-side electrical connection unit are separately formed from each other, which provides a structure that enables the plug-side optical connection unit to move in the inserting/removing direction.

6. A receptacle of a connector adapted to perform optical transmission,
the receptacle comprising a receptacle-side optical connection unit,
the receptacle-side optical connection unit including:
a receptacle-side optical connection part that is adapted to perform optical connection with a plug-side optical connection part provided on a side surface of a plug-side optical connection unit in a plug of the connector, in a direction orthogonal to an inserting/removing direction of the plug; and
a receptacle-side locating part that is adapted to abut on a plug-side locating part provided on the side surface of the plug-side optical connection unit to determine a position of the receptacle-side optical connection unit in a mating condition of the plug and the receptacle; and
a receptacle case adapted to abut on a plug-side shutter to cause an open condition of the plug-side optical connection,
the plug-side shutter that is adapted to move in the inserting/removing direction along the side surface of the plug-side optical connection unit, and
a plug-side first urging part that is adapted to urge the shutter in the inserting direction of the plug, and
the shutter covers the plug-side optical connection part in a closed condition thereof and allows the plug-side optical connection part to be exposed in an open condition thereof.

7. The receptacle according to claim 6, wherein
the receptacle-side locating part is disposed at a downstream side relative to the receptacle-side optical connection part, in the removing direction of the plug.

8. The receptacle according to claim 6, wherein
the receptacle-side locating part and the receptacle-side optical connection unit are integrally formed with each other.

9. The receptacle according to claim 6, further comprising
a receptacle-side holding part that is adapted to hold the plug in the receptacle in the mating condition while allowing the plug-side locating part that is provided on the plug-side optical connection unit urged in the inserting direction of the plug, to abut on the receptacle-side locating part.

10. The receptacle according to claim 6, further comprising
a receptacle-side electrical connection unit that has a plurality of electrical connection terminals arranged side by side in a width direction thereof, wherein
the receptacle-side optical connection unit is disposed outside the receptacle-side electrical connection unit in the width direction.

11. The receptacle according to claim 10, wherein
the receptacle-side optical connection unit and the receptacle-side electrical connection unit are separately formed from each other.

12. A connector adapted to perform optical transmission, comprising:
a plug of the connector provided with a plug-side optical connection unit; and
a receptacle of the connector provided with a receptacle-side optical connection unit,
the plug-side optical connection unit including:
a plug-side optical connection part that is provided on a side surface of the plug-side optical connection unit and adapted to perform optical connection with a receptacle-side optical connection part provided on the receptacle-side optical connection unit in a direction orthogonal to an inserting/removing direction of the plug; and
a plug-side locating part that is provided on the side surface of the plug-side optical connection unit and adapted to abut on a receptacle-side locating part of the receptacle to determine a position of the plug-side optical connection unit in a mating condition of the plug and the receptacle; and further comprising
a shutter that is adapted to move in the inserting/removing direction along the side surface of the plug-side optical connection unit, and
a first urging part that is adapted to urge the shutter in the inserting direction of the plug, wherein the shutter covers the plug-side optical connection part in a closed condition thereof and allows the plug-side optical connection part to be exposed in an open condition thereof; and the receptacle-side optical connection unit including:

the receptacle-side optical connection part that is adapted to perform optical connection with the plug-side optical connection part in the direction orthogonal to the inserting/removing direction of the plug; and a receptacle-side locating part that is adapted to abut on the plug-side locating part to determine a position of the receptacle-side optical connection unit in the mating condition.

13. The receptacle according to claim 7, wherein the receptacle-side locating part and the receptacle-side optical connection unit are integrally formed with each other.

14. The receptacle according to claim 7, further comprising a receptacle-side holding part that is adapted to hold the plug in the receptacle in the mating condition while allowing the plug-side locating part that is provided on the plug-side optical connection unit urged in the inserting direction of the plug, to abut on the receptacle-side locating part.

15. The receptacle according to claim 7, further comprising a receptacle-side electrical connection unit that has a plurality of electrical connection terminals arranged side by side in a width direction thereof, wherein the receptacle-side optical connection unit is disposed outside the receptacle-side electrical connection unit in the width direction.

* * * * *